(12) United States Patent
Han et al.

(10) Patent No.: US 12,082,249 B2
(45) Date of Patent: *Sep. 3, 2024

(54) APPARATUS AND METHOD FOR COORDINATED SPATIAL REUSE IN WIRELESS COMMUNICATION

(71) Applicant: SAMSUNG ELECTRONICS CO., LTD., Suwon-si (KR)

(72) Inventors: Jonghun Han, Gwacheon-si (KR); Chulho Chung, Yongin-si (KR); Sharan Naribole, San Jose, CA (US); Srinivas Kandala, Morgan Hill, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/159,383

(22) Filed: Jan. 25, 2023

(65) Prior Publication Data

US 2023/0164837 A1 May 25, 2023

Related U.S. Application Data

(63) Continuation of application No. 17/347,800, filed on Jun. 15, 2021, now Pat. No. 11,595,994.
(Continued)

(30) Foreign Application Priority Data

Feb. 18, 2021 (KR) .......................... 10-2021-0022026

(51) Int. Cl.
*H04W 74/08* (2024.01)
*H04W 74/0808* (2024.01)

(52) U.S. Cl.
CPC .............................. *H04W 74/0808* (2013.01)

(58) Field of Classification Search
CPC ........... H04W 74/0808; H04W 52/243; H04W 52/242; H04W 52/247; H04W 84/12;
(Continued)

(56) References Cited

U.S. PATENT DOCUMENTS 9,838,984 B2    12/2017  Yang et al.
9,907,089 B2     2/2018  Zhang et al.
(Continued)

FOREIGN PATENT DOCUMENTS

CN    107787018    3/2018
WO    2015069306   5/2015

OTHER PUBLICATIONS

"Multi-AP coordination for spatial reuse", doc: IEEE 802.11-20/0107r1.
(Continued)

*Primary Examiner* — Ahmed Elallam
(74) *Attorney, Agent, or Firm* — F. Chau & Associates, LLC

(57) ABSTRACT

A wireless communication method performed by a first apparatus includes acquiring a transmit opportunity (TXOP) to transmit or receive a first physical layer protocol data unit (PPDU), identifying a second apparatus for sharing the TXOP, permitting at least one of transmission and reception of a second PPDU to the second apparatus in the shared TXOP, and transmitting the first PPDU to at least one third apparatus in the shared TXOP or receiving the first PPDU from the at least one third apparatus.

20 Claims, 22 Drawing Sheets

Related U.S. Application Data

(60) Provisional application No. 63/041,284, filed on Jun. 19, 2020.

(58) Field of Classification Search
CPC ............ H04W 74/002; H04W 52/241; H04W 52/367; H04W 74/085; H04B 7/043; H04B 7/0617; H04B 7/0626; H04B 17/318; H04B 17/345
See application file for complete search history.

(56) References Cited

U.S. PATENT DOCUMENTS

| | | | |
|---|---|---|---|
| 10,548,166 | B2 | 1/2020 | Wang et al. |
| 10,582,537 | B2 | 3/2020 | Cariou et al. |
| 10,750,395 | B2 | 8/2020 | Zhou et al. |
| 11,477,781 | B2 * | 10/2022 | Hedayat ............... H04W 72/56 |
| 11,516,741 | B2 * | 11/2022 | Atefi ................. H04W 52/0245 |
| 11,595,994 | B2 * | 2/2023 | Han ................. H04W 74/0808 |
| 11,700,044 | B2 * | 7/2023 | Kwon ................ H04W 74/002 370/329 |
| 11,832,109 | B2 * | 11/2023 | Cherian ............... H04W 24/10 |
| 2020/0076552 | A1 * | 3/2020 | Cherian ............... H04L 5/0007 |
| 2020/0077273 | A1 * | 3/2020 | Cherian ............... H04W 16/02 |
| 2020/0245352 | A1 | 7/2020 | Seok et al. |
| 2020/0260488 | A1 | 8/2020 | Cherian et al. |
| 2021/0120548 | A1 | 4/2021 | Chen et al. |
| 2021/0136679 | A1 | 5/2021 | Verma et al. |
| 2021/0314879 | A1 * | 10/2021 | Seok ................... H04W 52/383 |
| 2021/0352663 | A1 | 11/2021 | Hedayat et al. |
| 2021/0400717 | A1 | 12/2021 | Han et al. |
| 2022/0150819 | A1 * | 5/2022 | Park ..................... H04W 48/20 |
| 2022/0294493 | A1 | 9/2022 | Garcia Rodriguez et al. |
| 2022/0302963 | A1 | 9/2022 | Garcia Rodriguez et al. |
| 2023/0007684 | A1 * | 1/2023 | Guo ..................... H04W 16/14 |
| 2023/0163808 | A1 * | 5/2023 | Lou ..................... H04W 74/002 455/101 |
| 2023/0164695 | A1 * | 5/2023 | Park ................... H04W 72/0446 370/318 |

OTHER PUBLICATIONS

Jianhan Liu, Mediatek Inc., "On Coordinated Spatial Reuse in 11be", doc: IEEE 802.11-20/0073r0, Nov. 2019.

Jonghun Han (Samsung): "Shared TXOP Spatial Reuse Consideration", IEEE Draft; 11-20-0590-00-00BE-Shared-TXOP-Spatial-Reuse-Considerations, IEEE-SA Mentor, Piscataway, NJ USA, vol. 802.11 EHT; 802.11be May 7, 2020 (May 7, 2020), pp. 1-16, XP068167795 https://mentor.IEEE.org/802.11/dcn/20/11-20-0590-00-00be-shared-txop-spatial-reuse-considerations.pptx.

Jonghun Han, Samsung, "Coordinated Spatial Reuse: Focus on Downlink", doc: IEEE 802.11-20/0590r0, Dated: May 7, 2020.

Jonghun Han, Samsung, "Coordinated Spatial Reuse: Focus on Downlink", doc.: IEEE 802.11-20/0590r4, Date: May 7, 2020.

Kosuke Aio (Sony Corporation) et al., "Discussion on Coordinated Spatial Reuse Operation", doc: IEEE 802.11-20/0457r1, Date: Mar. 26, 2020.

Sangjin Park et al., LG Electronics, "Coordinated Spatial Reuse Procedure", doc.: IEEE 802.11-20/0410r4, Dated: Mar. 16, 2020.

Yongho Seok, MediaTek, Coordinated Spatial Reuse (C-SR) Protocol, doc: IEEE 802.11-20/0576r1, Date: May 7, 2020.

ESSR dated Nov. 26, 2021 in corresponding EP Patent Application No. 21180105.5.

Notice of Allowance dated Sep. 30, 2022 in corresponding U.S. Appl. No. 17/347,800.

EESR dated Nov. 26, 2021 in corresponding EP Patent Application No. 21180105.5.

\* cited by examiner

FIG. 5

| MSB | LSB | Utilization of shared TXOP at shared BSS |
|---|---|---|
| 0 | 0 | Reserved |
| 0 | 1 | Only UL allowed |
| 1 | 0 | Only DL allowed |
| 1 | 1 | Both DL and UL Allowed |

APPARATUS AND METHOD FOR COORDINATED SPATIAL REUSE IN WIRELESS COMMUNICATION

CROSS-REFERENCE TO RELATED APPLICATIONS

This application is a continuation of U.S. patent application Ser. No. 17/347,800 filed Jun. 15, 2021, which is based on and claims priority under 35 U.S.C. § 119 to U.S. Provisional Patent Application No. 63/041,284, filed on Jun. 19, 2020, and Korean Patent Application No. 10-2021-0022026, filed on Feb. 18, 2021, the disclosures of which are incorporated by reference herein in their entireties.

TECHNICAL FIELD

Example embodiments of the inventive concept relate to wireless communication, and in particular, to an apparatus and a method for coordinated spatial reuse in wireless communication.

DISCUSSION OF RELATED ART

As an example of wireless communication, a wireless local area network (WLAN) is a technology that connects two or more apparatuses to each other using a wireless signal transmission method. WLAN technology may be based on the Institute of Electrical and Electronics Engineers (IEEE) 802.11 standard. The 802.11 standard has evolved into 802.11b, 802.11a, 802.11g, 802.11n, 802.11ac, and 802.11ax, and may support a transmission speed of up to 1 Gbyte/s based on orthogonal frequency-division multiplexing (OFDM) technology.

In 802.11ac, data may be simultaneously transmitted to multiple users through multi-user multi-input multi-output (MU-MIMO) technology. In 802.11ax, also referred to as high efficiency (HE), both MU-MIMO and also orthogonal frequency-division multiple access (OFDMA) technology are applied to divide and provide usable subcarriers to users, thereby implementing multiple access. Therefore, WLAN systems to which 802.11ax is applied may effectively support communication in dense areas and outdoors.

802.11be, which is also referred to as extremely high throughput (EHT), is intended to implement support of a 6 GHz unlicensed frequency band, utilization of a bandwidth of maximum 320 MHz per channel, introduction of hybrid automatic repeat and request (HARD), support of maximum 16×16 MIMO, or the like. Next-generation WLAN systems are expected to effectively support low latency and ultra-high-speed transmission like new radio (NR), which is a 5G technology.

SUMMARY

Embodiments of the inventive concept provide an apparatus and a method for efficiently performing spatial reuse in wireless communication.

According to an embodiment of the inventive concept, a wireless communication method performed by a first apparatus may include acquiring a transmit opportunity (TXOP) to transmit or receive a first physical layer protocol data unit (PPDU), identifying a second apparatus for sharing the TXOP, permitting at least one of transmission and reception of a second PPDU to the second apparatus in the shared TXOP, and transmitting the first PPDU to at least one third apparatus or receiving the first PPDU from the at least one third apparatus in the shared TXOP.

According to an embodiment of the inventive concept, a first apparatus for wireless communication may include a transceiver and a processing circuitry. The processing circuitry is configured to obtain a TXOP to transmit or receive a first PPDU through the transceiver, identify a second apparatus for sharing the TXOP, permit at least one of transmission and reception of a second PPDU to the second apparatus through the transceiver in the shared TXOP, and transmit the first PPDU to at least one third apparatus through the transceiver in the shared TXOP or receive the first PPDU from at least one third apparatus.

According to an embodiment of the inventive concept, a wireless communication method performed by a first apparatus may include acquiring a transmit opportunity (TXOP) to transmit or receive a first physical layer protocol data unit (PPDU), identifying a second apparatus for sharing the TXOP, providing a tolerable interference limit of transmission or reception of the first PPDU in the shared TXOP to the second apparatus, and transmitting the first PPDU to at least one third apparatus in the shared TXOP or receiving the first PPDU from at least one third apparatus.

According to an embodiment of the inventive concept, a wireless communication method performed by a third apparatus associated with a second apparatus in a TXOP shared by a first apparatus and the second apparatus may include receiving a frame from the first apparatus, determining a path loss between the first apparatus and the third apparatus based on the frame, transmitting information on the path loss to the second apparatus, and receiving a physical layer protocol data unit (PPDU) in the shared TXOP or transmitting the PPDU to the second apparatus.

BRIEF DESCRIPTION OF THE DRAWINGS

The above and other features of the present inventive concept will become more apparent by describing in detail example embodiments thereof with reference to the accompanying drawings, in which:

FIG. 5 is a diagram illustrating an example of information provided to a shared access point by a sharing access point according to an example embodiment of the inventive concept;

DETAILED DESCRIPTION OF THE EMBODIMENTS

Figure 1:
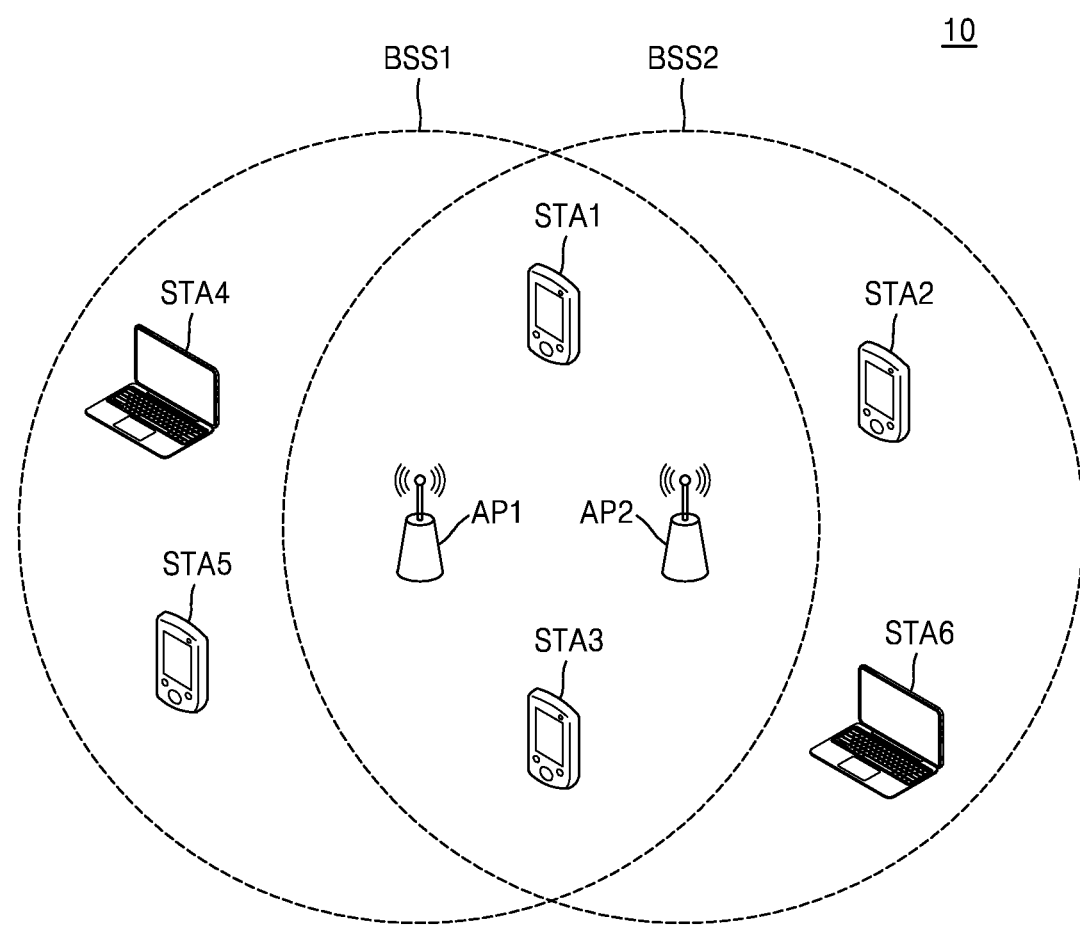
FIG. 1 is a diagram illustrating a wireless communication system according to an example embodiment of the inventive concept.

Example embodiments of the present inventive concept will be described more fully hereinafter with reference to the accompanying drawings. Like reference numerals may refer to like elements throughout the accompanying drawings.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to exemplary embodiments, the parameter may be exactly the certain value or approximately the certain value within a measurement error as would be understood by a person having ordinary skill in the art.

As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram illustrating a wireless communication system 10 according to an example embodiment of the inventive concept. In some embodiments, the wireless communication system may be a wireless local area network (WLAN) system.

Hereinafter, in describing embodiments of the inventive concept in detail, an orthogonal frequency-division multiplexing (OFDM) or OFDMA-based wireless communication system, in particular, the IEEE 802.11, standard will be described as being implemented. However, embodiments of the inventive concept are not limited thereto, and may be applied to other communication systems such as, for example, a cellular communication system such as long term evolution (LTE), LTE-advanced (LTE-A), new radio (NR), and wireless broadband (WiBro), a global system for mobile communication (GSM), or a short-range communication system such as BLUETOOTH and near field communication (NFC), having similar technical background and channel types with slight modifications within the scope not significantly departing from the scope of embodiments of the inventive concept.

In addition, various functions described below may be implemented or supported by one or more computer programs, each of which is configured of a computer readable program code and executed on a computer readable medium. The terms "application" and "program" refer to one or more computer programs, software components, instruction sets, procedures, functions, objects, classes, instances, related data, or portions thereof suitable for implementation of a suitable computer readable program code. The term "computer-readable program code" includes all types of computer codes including source code, object code, and executable code. The term "computer-readable medium" means all types of media that may be accessed by a computer, such as, for example, read only memory (ROM), random access memory (RAM), a hard disk drive, a compact disc (CD), a digital video disc (DVD), or some other type of memory. "Non-transitory" computer-readable media excludes wired, wireless, optical, or other communication links that transmit transient electrical or other signals. Non-transitory computer-readable media includes media on which data may be permanently stored, and media on which data may be stored and later overwritten, such as a rewritable optical disk or erasable memory apparatus.

The wireless communication system 10 may expand a service area by an access point (AP). A station (STA) may communicate with the access point in a basic service set (BSS) provided by the access point, and may access a network such as the Internet or an Internet Protocol (IP) network through the access point. For example, as illustrated in FIG. 1, a first access point AP1 may provide a first BSS BSS1, and a first station STA1, a third station STA3, a fourth station STA4, and a fifth station STA5 may communicate with the first access point AP1. In addition, a second access point AP2 may provide a second BSS BSS2, and the first station STA1, a second station STA2, the third station STA3, and a sixth station STA6 may communicate with the second access point AP2. As illustrated in FIG. 1, the first station STA1 and the third station STA3 may access both the first access point AP1 and the second access point AP2. In FIG. 1, dotted lines indicate an approximate extent of each of the first BSS BSS1 and the second BSS BSS2, and may have a shape different from a circular shape illustrated in FIG. 1.

The access points and stations may communicate with each other using wireless fidelity (Wi-Fi) or any other WLAN communication technology. The access point may be referred to as, for example, a router, a gateway, and the like, and the station may be referred to as, for example, a mobile station, a subscriber station, a terminal, a mobile terminal, a wireless terminal, a user equipment, a user, and the like. The station may be a portable apparatus such as, for example, a mobile phone, a laptop computer, or a wearable apparatus, or may be a stationary apparatus such as, for example, a desktop computer or a smart TV. Examples of the access points and the stations will be described in further detail below with reference to FIG. 17.

The 802.11-based medium access control (MAC) protocol may regard the simultaneous execution of two or more signal transmissions as collision, and accordingly, the access points and the stations may use channels through competition. For example, the access point and the station may communicate with each other based on carrier sense multiple access (CSMA) and/or collision avoidance (CA), and accordingly, while the first access point AP1 performs the transmission to the first station STA1, the second access point AP2 may delay the transmission for the third station STA3. The collision may occur frequently in an overlapping basic service set (OBSS) environment in which a plurality of access points and a plurality of stations exist, and accordingly, the performance of the wireless communication system 10, for example, a throughput, may be limited.

Spatial reuse (SR) may enable colliding transmissions to occur simultaneously. For example, while the first access point AP1 performs the first transmission to the first station STA1, the second access point AP2 may perform the second transmission to the second station STA2 with a level of transmission power that does not interfere with reception of the first station STA1, instead of delaying the transmission to the second station STA2. Accordingly, the first transmission to the first station STA1 and the second transmission to the second station STA2 may be performed in parallel, and an amount of transmission in the wireless communication system 10 may increase. Herein, a transmission associated with an access point that obtains a transmit opportunity (TXOP) may be referred to as the first transmission, and a transmission associated with an access point that is provided with a shared TXOP may be referred to as the second transmission.

In 802.11ax, the access point or the station may identify the first transmission based on a preamble, and if the first transmission is identified, may perform the second transmission, which at least partially overlaps the first transmission, with the transmission power determined based on reception power of the preamble. However, the second transmission may not be considered in the first transmission, and thereby, the efficiency of spatial reuse may be limited. As will be described below with reference to the drawings, in spatial reuse, in addition to the second transmission considering the first transmission, the first transmission may also consider the second transmission, and thus, more efficient spatial reuse may be achieved.

Herein, spatial reuse in which the first transmission considers the second transmission may be referred to as coordinated spatial reuse (C-SR). In addition, the access point associated with the first transmission (that is, acquiring the TXOP) may be referred to as a sharing access point, and the BSS provided by the sharing access point may be referred to as a sharing BSS. The access point associated with the second transmission may be referred to as a shared access point, and the BSS provided by the shared access point may be referred to as a shared BSS. Unless otherwise stated, it is assumed that the first access point AP1 is the sharing access point, and the second access point AP2 is the shared access point. The first access point AP1 and the second access point AP2 may be referred to as a first apparatus and a second apparatus, respectively, and each of the stations may be referred to as a third apparatus or a fourth apparatus. A physical layer protocol data unit (PPDU) transmitted between the first access point AP1 and at least one station included in the first BSS BSS1 provided by the first access point AP1 may be referred to as a first PPDU. A PPDU transmitted between the second access point AP2 and at least one station included in the second BSS BSS2 provided by the second access point AP2 may be referred to as a second PPDU.

Figure 2:
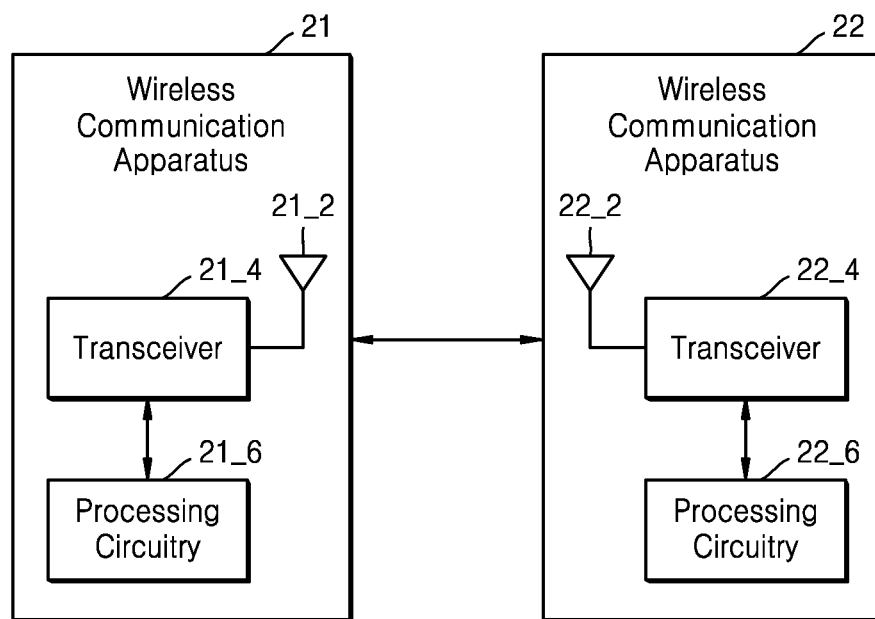
FIG. 2 is a block diagram illustrating a wireless communication system according to an example embodiment of the inventive concept.

FIG. 2 is a block diagram illustrating a wireless communication system 20 according to an example embodiment of the inventive concept. For example, the block diagram of FIG. 2 illustrates a first wireless communication apparatus 21 and a second wireless communication apparatus 22 communicating with each other in the wireless communication system 20. Each of the first wireless communication apparatus 21 and the second wireless communication apparatus 22 of FIG. 2 may be any apparatus that communicates in the wireless communication system 20, and may be referred to as an apparatus for wireless communication. In some embodiments, each of the first wireless communication apparatus 21 and the second wireless communication apparatus 22 may be an access point or station of the WLAN system.

Referring to FIG. 2, the first wireless communication apparatus 21 may include an antenna 21_2, a transceiver 21_4, and a processing circuitry 21_6. In some embodiments, the antenna 21_2, the transceiver 21_4, and the processing circuitry 21_6 may be included in one package, or may be included in different packages, respectively. The second wireless communication apparatus 22 may also include an antenna 22_2, a transceiver 22_4, and a processing circuitry 22_6. Hereinafter, redundant descriptions of the first wireless communication apparatus 21 and the second wireless communication apparatus 22 will be omitted for convenience of explanation.

The antenna 21_2 may receive a signal from the second wireless communication apparatus 22 and provide the signal to the transceiver 21_4, and may transmit a signal provided from the transceiver 21_4 to the second wireless communication apparatus 22. In some embodiments, the antenna 21_2 may include a plurality of antennas for a multiple input multiple output (MIMO). Further, in some embodiments, the antenna 21_2 may include a phased array for beam forming.

The transceiver 21_4 may process a signal received from the second wireless communication apparatus 22 through the antenna 21_2 and may provide the processed signal to the processing circuitry 21_6. In addition, the transceiver 21_4 may process a signal provided from the processing circuitry 21_6, and may output the processed signal through the antenna 21_2. In some embodiments, the transceiver 21_4 may include an analog circuit such as, for example, a low noise amplifier, a mixer, a filter, a power amplifier, or an oscillator. In some embodiments, the transceiver 21_4 may process a signal received from the antenna 21_2 and/or a signal received from the processing circuitry 21_6 based on the control of the processing circuitry 21_6.

The processing circuitry 21_6 may extract information transmitted by the second wireless communication apparatus 22 by processing the signal received from the transceiver 21_4. For example, the processing circuitry 21_6 may extract information by demodulating and/or decoding a signal received from the transceiver 21_4. In addition, a signal including information to be transmitted to the second wireless communication apparatus 22 may be generated and provided to the transceiver 21_4. For example, the processing circuitry 21_6 may provide a signal generated by encoding and/or modulating data to be transmitted to the second wireless communication apparatus 22, to the transceiver 21_4. In some embodiments, the processing circuitry 21_6 may include a programmable component such as, for example, a central processing unit (CPU) or a digital signal processor (DSP), a reconfigurable component such as, for example, a field programmable gate array (FPGA), or a component providing a fixed function such as, for example, an intellectual property (IP) core. In some embodiments, the processing circuitry 21_6 may include a memory that stores data and/or a series of instructions, or accesses the memory. Herein, performing operations by the transceiver 21_4 and/or the processing circuitry 21_6 may be referred to as performing the operations by the first wireless communication apparatus 21. Accordingly, operations performed by the access point may be performed by the transceiver and/or the processing circuitry included in the access point, and operations performed by the station may be performed by the transceiver and/or the processing circuitry included in the station.

FIGS. 3A to 3D are diagrams illustrating scenarios of coordinated spatial reuse according to example embodiments of the inventive concept. For example, FIGS. 3A to 3D illustrate wireless communication systems 30a, 30b, 30c, and 30d each including the first access point AP1, the second access point AP2, the first station STA1, the second station STA2, and the third station STA3. Hereinafter, transmission of the PPDU including data by the access point to the station may be referred to as a downlink (DL) transmission, and transmission of the PPDU including data by the station to the access point may be referred to as an uplink (UL) transmission. In describing FIGS. 3A to 3D, for convenience of explanation, a further description of elements and technical aspects previously described may be omitted.

Figure 3A:
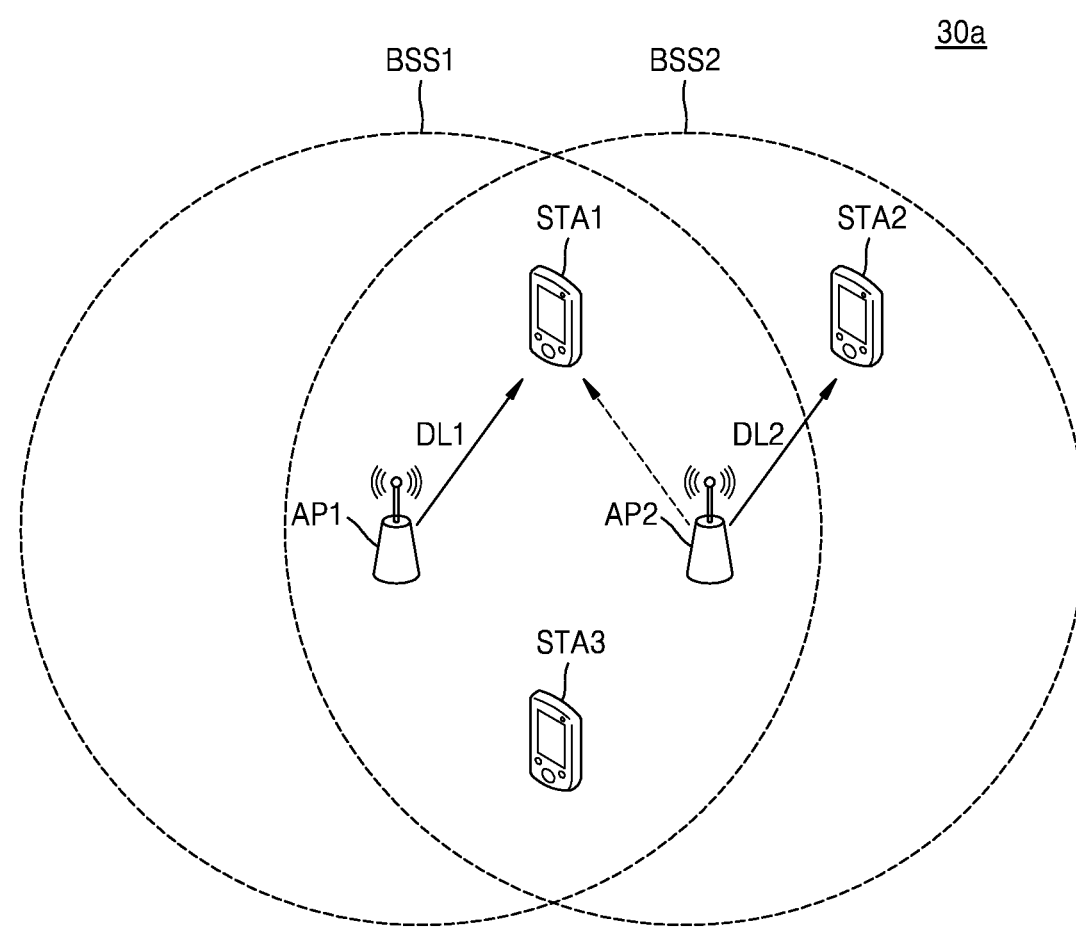
FIGS. 3A to 3D are diagrams illustrating scenarios of coordinated spatial reuse according to example embodiments of the inventive concept.

Referring to FIG. 3A, a first downlink transmission DL1 of a first BSS BSS1 and a second downlink transmission DL2 of a second BSS BSS2 may occur. For example, the first access point AP1 may obtain the TXOP to transmit the first PPDU to the first station STA1. The first access point AP1 may transmit the first PPDU to the first station STA1 in the shared TXOP, and the second access point AP2 may transmit the second PPDU to the second station STA2 in the shared TXOP. As illustrated by the dotted arrow in FIG. 3A, the second downlink transmission DL2 may act as interference for the first station STA1 to process the first downlink transmission DL1. As transmission power of the second downlink transmission DL2 increases, a signal-to-interference ratio (SIR) at the first station STA1 may decrease, and accordingly, the second access point AP2 may perform the second downlink transmission DL2 in consideration of an appropriate signal-to-interference ratio of the first station STA1. Herein, the example of FIG. 3A may be referred to as a DL/DL scenario or a DL/DL case of the coordinated spatial reuse.

In some embodiments, different from that illustrated in FIG. 3A, the first access point AP1 may provide the downlink transmission to a multi-user (MU), that is, a plurality of stations. In addition, in some embodiments, the second access point AP2 may also provide the downlink transmission to the plurality of stations. Herein, it is noted that the DL/DL scenario or the DL/DL case of coordinated spatial reuse may cover the above-described multi-user downlink transmission as well as the single user (SU) downlink transmission illustrated in FIG. 3A.

Figure 3B:
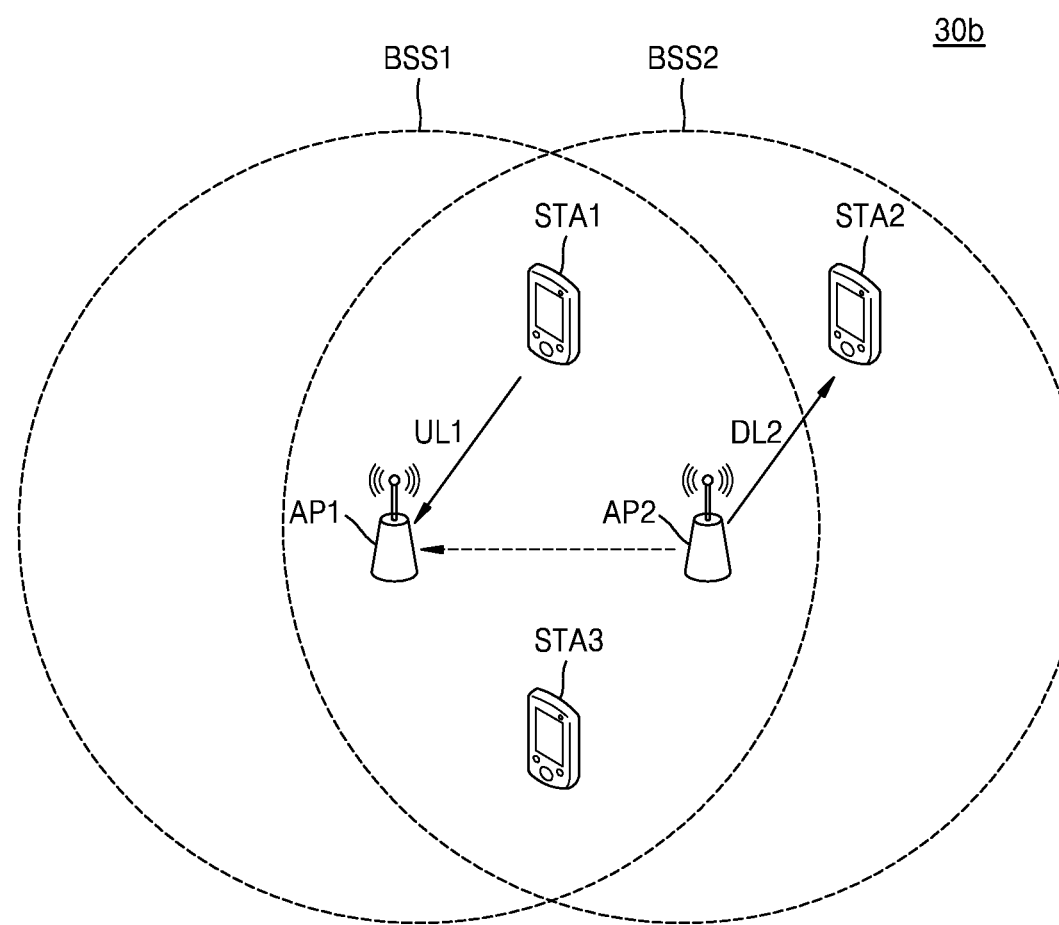

Referring to FIG. 3B, a first uplink transmission UL1 of the first BSS BSS1 and a second downlink transmission DL2 of the second BSS BSS2 may occur. For example, the first access point AP1 may obtain the TXOP to receive the first PPDU from the first station STA1. The first station STA1 may transmit the first PPDU to the first access point AP1 in the shared TXOP, and the second access point AP2 may transmit the second PPDU to the second station STA2 in the shared TXOP. As illustrated by a dotted arrow in FIG. 3B, the second downlink transmission DL2 may act as interference for the first access point AP1 to process the first uplink transmission UL1. As transmission power of the second downlink transmission DL2 increases, the signal-to-interference ratio at the first access point AP1 may decrease, and accordingly, the second access point AP2 may perform the second downlink transmission DL2 in consideration of an appropriate signal-to-interference ratio of the first access point AP1. Herein, the example of FIG. 3B may be referred to as a UL/DL scenario or a UL/DL case of the coordinated spatial reuse.

In some embodiments, unlike FIG. 3B, multiple users, that is, the plurality of stations, may provide uplink transmissions to the first access point AP1. Further, in some embodiments, the second access point AP2 may provide downlink transmissions to the plurality of stations. Herein, it is noted that the UL/DL scenario or the UL/DL case of coordinated spatial reuse may cover both the single-user uplink transmission and the single-user downlink transmission illustrated in FIG. 3B, as well as the multi-user uplink transmission and/or the multi-user downlink transmission.

Figure 3C:
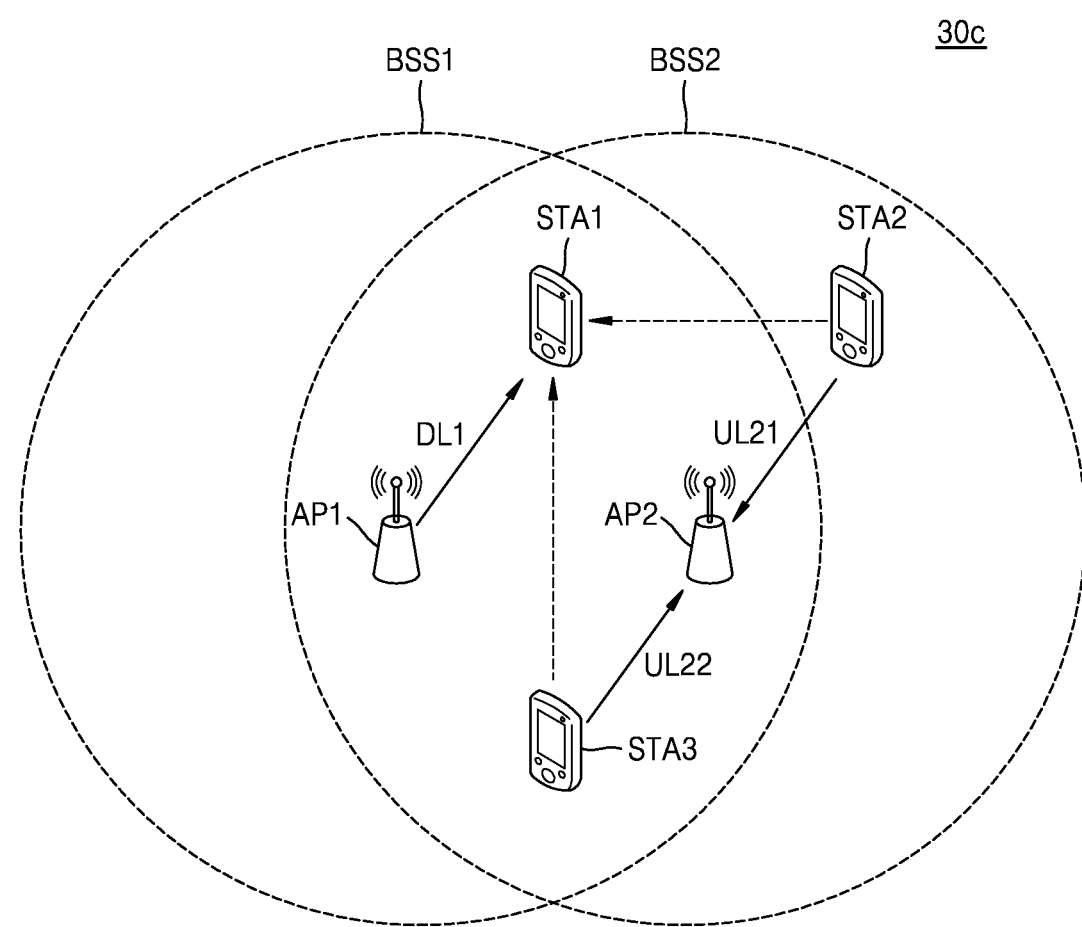

Referring to FIG. 3C, the first downlink transmission DL1 of the first BSS BSS1 and the second uplink transmissions UL21 and UL22 of the second BSS BSS2 may occur. For example, the first access point AP1 may obtain the TXOP to transmit the first PPDU. The first access point AP1 may transmit the first PPDU to the first station STA1 in the shared TXOP, and the second station STA2 and the third station STA3 may transmit the second PPDUs to the second access point AP2 in the shared TXOP. As illustrated by dotted arrows in FIG. 3C, the second uplink transmissions UL21 and UL22 may act as interference for processing the first downlink transmission DL1. As transmission power of the second uplink transmissions UL21 and UL22 increases, the signal-to-interference ratio at the first station STA1 may decrease, and accordingly, the second station STA2 and the third station STA3 may perform the second uplink transmissions UL21 and UL22 in consideration of an appropriate signal-to-interference ratio of the first station STA1. Herein, the example of FIG. 3C may be referred to as the DL/UL scenario or the DL/UL case of the coordinated spatial reuse.

In some embodiments, unlike FIG. 3C, the first access point AP1 may provide the downlink transmission to the multi-user (MU), that is, the plurality of stations. Further, in some embodiments, the single user, that is, one station, may provide the uplink transmission to the second access point AP2. Herein, it is noted that the DL/UL scenario or the DL/UL case of coordinated spatial reuse may cover single-user downlink transmission and the multi-user uplink transmission illustrated in FIG. 3C, as well as the multi-user downlink transmission and/or the single-user uplink transmission.

Figure 3D:
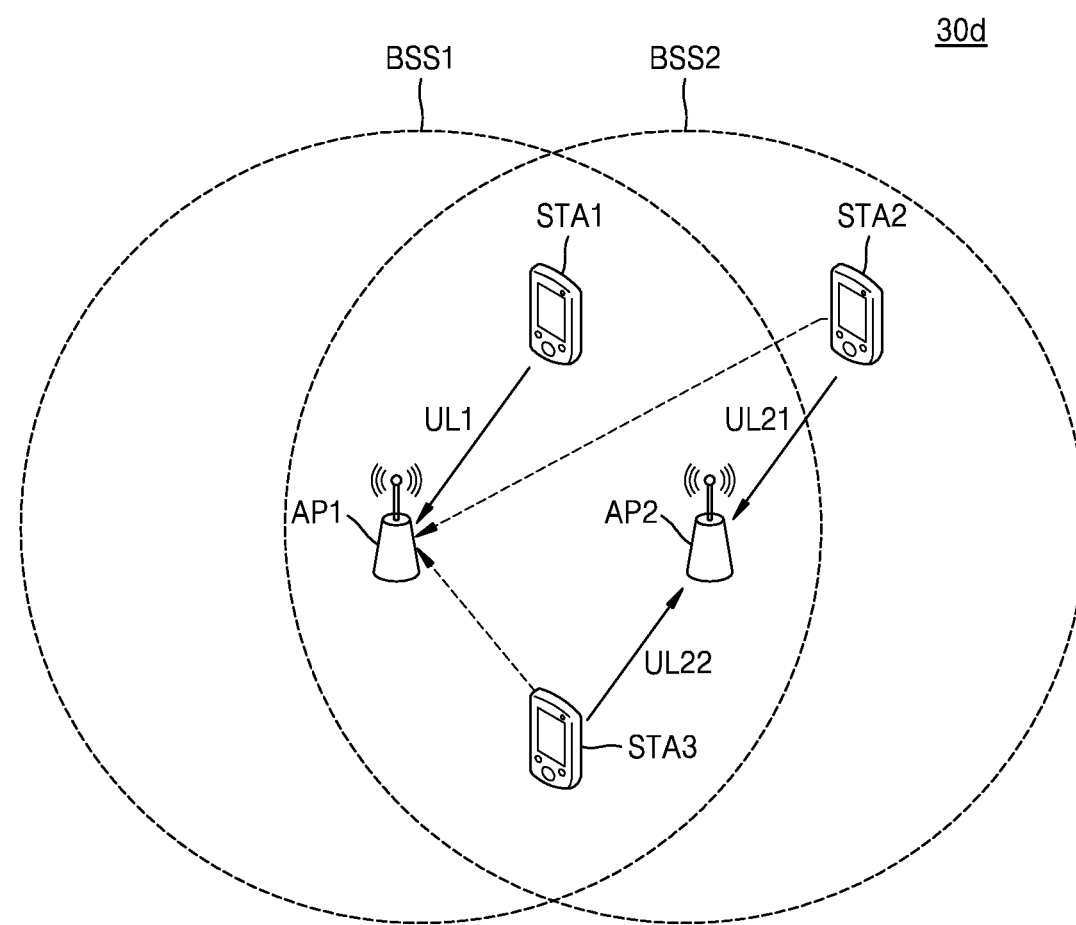

Referring to FIG. 3D, the first uplink transmission UL1 of the first BSS BSS1 and the second uplink transmissions UL21 and UL22 of the second BSS BSS2 may occur. For example, the first access point AP1 may obtain the TXOP to receive the first PPDU. The first station STA1 may transmit the first PPDU to the first access point AP1 in the shared TXOP, and the second station STA2 and the third station STA3 may transmit the second PPDUs to the second access point AP2 in the shared TXOP. As illustrated by dotted arrows in FIG. 3D, the second uplink transmissions UL21 and UL22 may act as interference in processing the first uplink transmission UL1. As transmission power of the second uplink transmissions UL21 and UL22 increases, the signal-to-interference ratio at the first access point AP1 may decrease, and accordingly, the second station STA2 and the third station STA3 may perform second uplink transmissions UL21 and UL22 in consideration of an appropriate signal-to-interference ratio of the first access point AP1. Herein, the example of FIG. 3D may be referred to as the UL/UL scenario or the UL/UL case of the coordinated spatial reuse.

In some embodiments, unlike FIG. 3D, the multi-user, that is, the plurality of stations, may provide the uplink transmissions to the first access point AP1. Further, in some embodiments, the single user, that is, one station, may provide the uplink transmission to the second access point AP2. Herein, it is noted that the UL/UL scenario or the UL/UL case of the coordinated spatial reuse may cover the single-user uplink transmission and the multi-user uplink transmission illustrated in FIG. 3D, as well as the multi-user uplink transmission and/or the single-user uplink transmission. Examples of a method for coordinated spatial reuse corresponding to the scenarios described above with reference to FIGS. 3A to 3D will be described further below.

Figure 4:
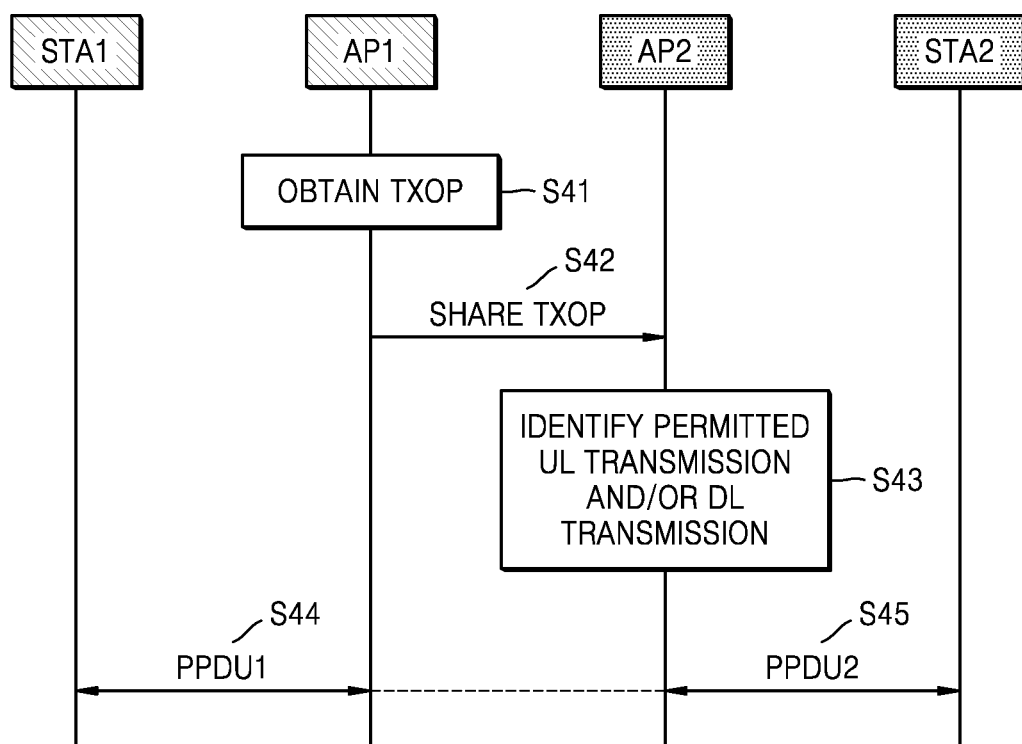
FIG. 4 is a message diagram illustrating a method for coordinated spatial reuse according to an example embodiment of the inventive concept.

FIG. 4 is a message diagram showing a method for the coordinated spatial reuse according to an example embodiment of the inventive concept. As illustrated in FIG. 4, the method for the coordinated spatial reuse may include a plurality of operations (S41 to S45). As described above with reference to FIG. 1, the first access point AP1 of FIG. 4 may be the sharing access point, and the second access point AP2 may be the shared access point. In FIG. 4, the first station STA1 may be associated with the first access point AP1 in the first BSS BSS1 provided by the first access point AP1, and the second station STA2 may be associated with the second access point AP2 in the second BSS BSS2 provided by the second access point AP2.

Referring to FIG. 4, in operation S41, the first access point AP1 may obtain the TXOP. For example, the first access point AP1 may obtain the TXOP to transmit the first PPDU to the first station STA1 or receive the first PPDU from the first station STA1. As described above with reference to FIG. 1, the first access point AP1 may obtain the TXOP through competition with at least one station or another access point. For spatial reuse, the TXOP obtained by the first access point AP1 may be shared with the second access point AP2.

In operation S42, the first access point AP1 may share the TXOP with the second access point AP2. For example, the first access point AP1 may permit at least one of transmission and reception of a second PPDU to the second access point AP2 in the shared TXOP. The first access point AP1 may permit the uplink transmission and/or the downlink transmission in the second BSS so as not to interfere with transmission or reception of the first PPDU in the first BSS BSS1. In some embodiments, the first access point AP1 may transmit a signal (for example, AF or PPDU0 in FIG. 13) including information indicating permission of the uplink transmission and/or the downlink transmission to the second access point AP2. An example of information indicating the permission of the uplink transmission and/or the downlink transmission will be described later with reference to FIG. 5.

As will be described later with reference to FIGS. 8A and 8B, estimating the interference caused by the second transmission by the first access point AP1 may be more difficult in a case in which the uplink transmission occurs in the second BSS BSS2 than in a case in which downlink transmission occurs in the second BSS BSS2. Accordingly, the first access point AP1 may permit at least one of the uplink transmission and the downlink transmission to the second access point AP2 so as not to interfere with transmission or reception of the first PPDU. In some embodiments, in a case in which a path loss between the first access point AP1 and the first station STA1 is higher than a predefined threshold value, the first access point AP1 may permit only the downlink transmission to the second access point AP2. In some embodiments, the coordinated spatial reuse may define only the downlink transmission in the shared BSS (that is, the second BSS BSS2), and accordingly, operation S42 and operation S43 to be described later may be omitted, and the second access point AP2 may only perform the downlink transmission, that is, the transmission of the second PPDU in the shared TXOP.

In operation S43, the second access point AP2 may identify at least one of permitted uplink transmission and downlink transmission. For example, the second access point AP2 may extract information permitting the uplink transmission and/or the downlink transmission from a signal received from the first access point AP1 in operation S42. In some embodiments, in a case in which the uplink transmission is permitted, the second access point AP2 may transmit a trigger frame to the second station STA2 to receive the second PPDU PPDU2.

The first PPDU PPDU1 may be transmitted between the first access point AP1 and the first station STA1 in operation S44, and the second PPDU PPDU2 may be transmitted between the second access point AP2 and the second station STA2 in operation S45. For example, in operation S44, the first access point AP1 may transmit the first PPDU PPDU1 to the first station STA1 in the shared TXOP, or the first station STA1 may transmit the first PPDU PPDU1 to the first access point AP1 in the shared TXOP. In addition, when the uplink transmission is identified in operation S43, the second station STA2 may transmit the second PPDU PPDU2 to the second access point AP2, and when downlink transmission is identified in operation S43, the second access point AP2 may transmit the second PPDU PPDU2 to the second station STA2.

FIG. 5 is a diagram illustrating an example of information provided to a shared access point by a sharing access point according to an example embodiment of the inventive concept. For example, FIG. 5 illustrates a table including values provided by the first access point AP1 to permit at least one of the uplink transmission and the downlink transmission to the second access point AP2 in operation S42 of FIG. 4. Hereinafter, FIG. 5 will be described with reference to FIG. 4.

In some embodiments, permission of at least one of the uplink transmission and the downlink transmission may be expressed as a value of 2-bit. For example, as illustrated in FIG. 5, a most significant bit (MSB) of 2-bits may indicate whether the downlink transmission is permitted, and a least significant bit (LSB) of 2-bits may indicate whether the uplink transmission is permitted. Accordingly, "01" may correspond to permission of uplink transmission, "10" may correspond to permission of downlink transmission, and "11" may correspond to permission of both uplink transmission and downlink transmission. In some embodiments, as described below with reference to FIG. 13, the 2-bit value of FIG. 5 may correspond to a field included in an announcement frame (for example, AF of FIG. 13) transmitted from the first access point AP1 to the second access point AP2. In some embodiments, to represent the three combinations described above, the 2-bit value having different values as illustrated in FIG. 5 may be used.

Figure 6:
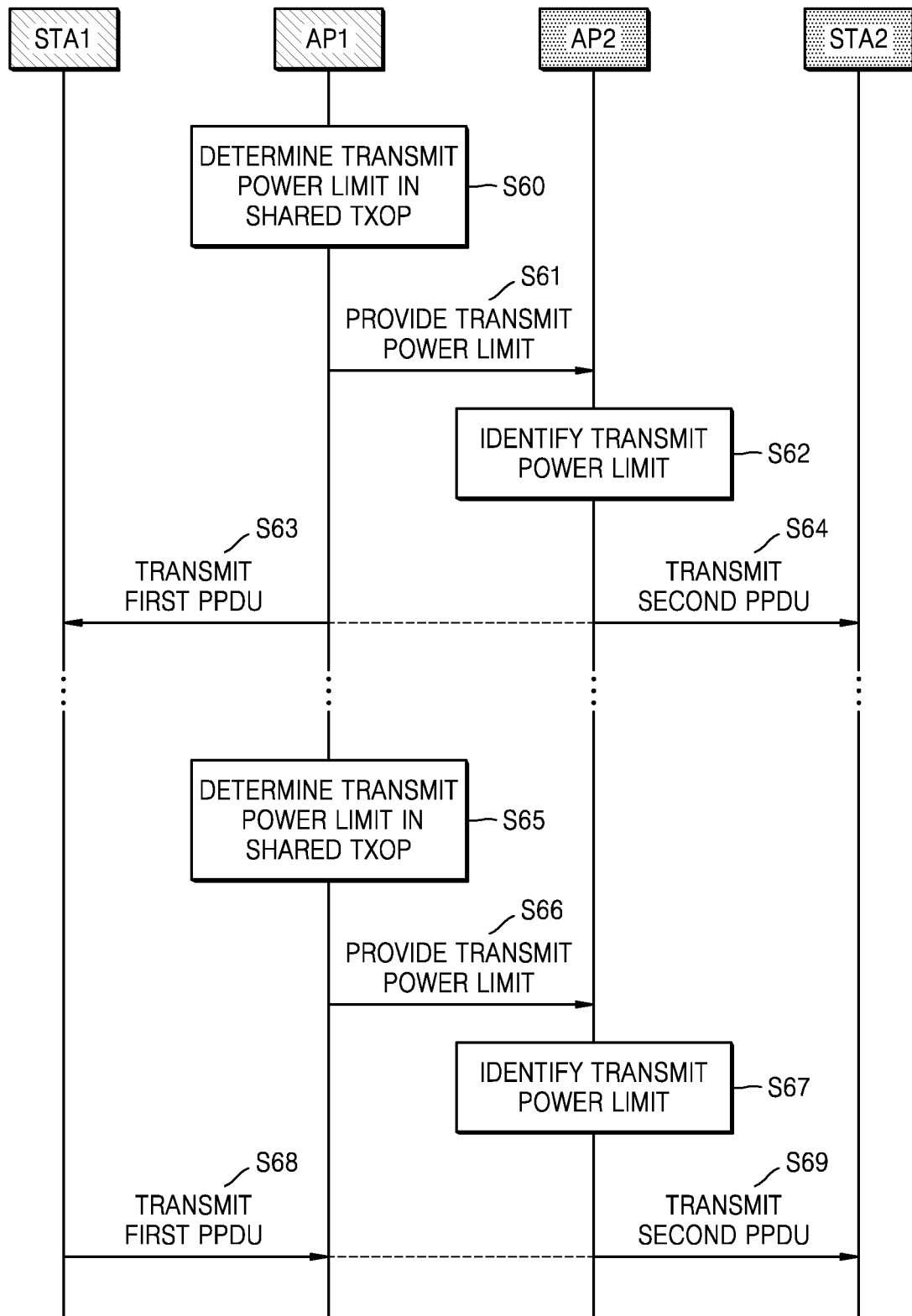
FIG. 6 is a message diagram illustrating a method for coordinated spatial reuse according to an example embodiment of the inventive concept.

FIG. 6 is a message diagram showing a method for the coordinated spatial reuse according to an example embodiment of the inventive concept. For example, the message diagram of FIG. 6 illustrates operations performed in each of the DL/DL scenario and the UL/DL scenario of the coordinated spatial reuse, as described above with reference to FIGS. 3A and 3B. As illustrated in FIG. 6, the method for the coordinated spatial reuse may include a plurality of operations (S60 to S69). In FIG. 6, the first station STA1 may be included in the first BSS BSS1 provided by the first access point AP1, and the second station STA2 may be included in the second BSS BSS2 provided by the second access point AP2. In addition, before operations S60 and S65 are respectively performed in FIG. 6, it is assumed that the first access point AP1 has obtained the TXOP.

Referring to FIG. 6, in operation S60, the first access point AP1 may determine a transmit power limit (TPL) in the shared TXOP. The transmit power limit may correspond to maximum transmit power allowed when the second access point AP2 transmits the second PPDU to the second station STA2 in the shared TXOP. For example, the first access point AP1 may obtain the TXOP to transmit the first PPDU to the first station STA1, and may determine the transmit power limit based on at least one path loss associated with the first station STA1. An example of the operation of determining the transmit power limit in the DL/DL scenario and the UL/DL scenario of the coordinated spatial reuse will be described in further detail with reference to FIG. 7.

In operation S61, the first access point AP1 may provide the transmit power limit to the second access point AP2. For example, the first access point AP1 may transmit a signal including the transmit power limit determined in operation S60 to the second access point AP2. In some embodiments, as described below with reference to FIG. 13, the transmit power limit may be included in the announcement frame.

In operation S62, the second access point AP2 may identify the transmit power limit. For example, the second access point AP2 may extract the transmit power limit from the signal received from the first access point AP1 in operation S61. In some embodiments, the transmit power limit may have the same format as that of a transmit power field included in a transmit power control (TPC) report, and the second access point AP2 may identify the transmit power limit corresponding to a value of the transmit power limit.

In operation S63, the first access point AP1 may transmit the first PPDU to the first station STA1 in the shared TXOP, and in operation S64 the second access point AP2 may transmit the second PPDU to the second station STA2 in the shared TXOP. The second access point AP2 may transmit the second PPDU with a transmit power about equal to or less than the transmit power limit identified in operation S62, and accordingly, interference caused by the transmission of the second PPDU may be reduced or eliminated. The first station STA1 may successfully receive the first PPDU.

In operation S65, the first access point AP1 may determine the transmit power limit in the shared TXOP. For example, the first access point AP1 may obtain the TXOP to receive the first PPDU from the first station STA1, and may determine the transmit power limit based on at least one path loss associated with the first access point AP1. An example of the operation of determining the transmit power limit will be described later with reference to FIG. 7.

In operation S66, the first access point AP1 may provide the transmit power limit to the second access point AP2. In operation S67, the second access point AP2 may identify the transmit power limit.

In operation S68, the first station STA1 may transmit the first PPDU to the first access point AP1 in the shared TXOP, and in operation S69, the second access point AP2 may transmit the second PPDU to the second station STA2 in the shared TXOP. The second access point AP2 may transmit the second PPDU with transmit power about equal to or less than the transmit power limit identified in operation S67, and accordingly, interference caused by the transmission of the second PPDU may be reduced or eliminated. The first access point AP1 may successfully receive the first PPDU.

Figure 7:
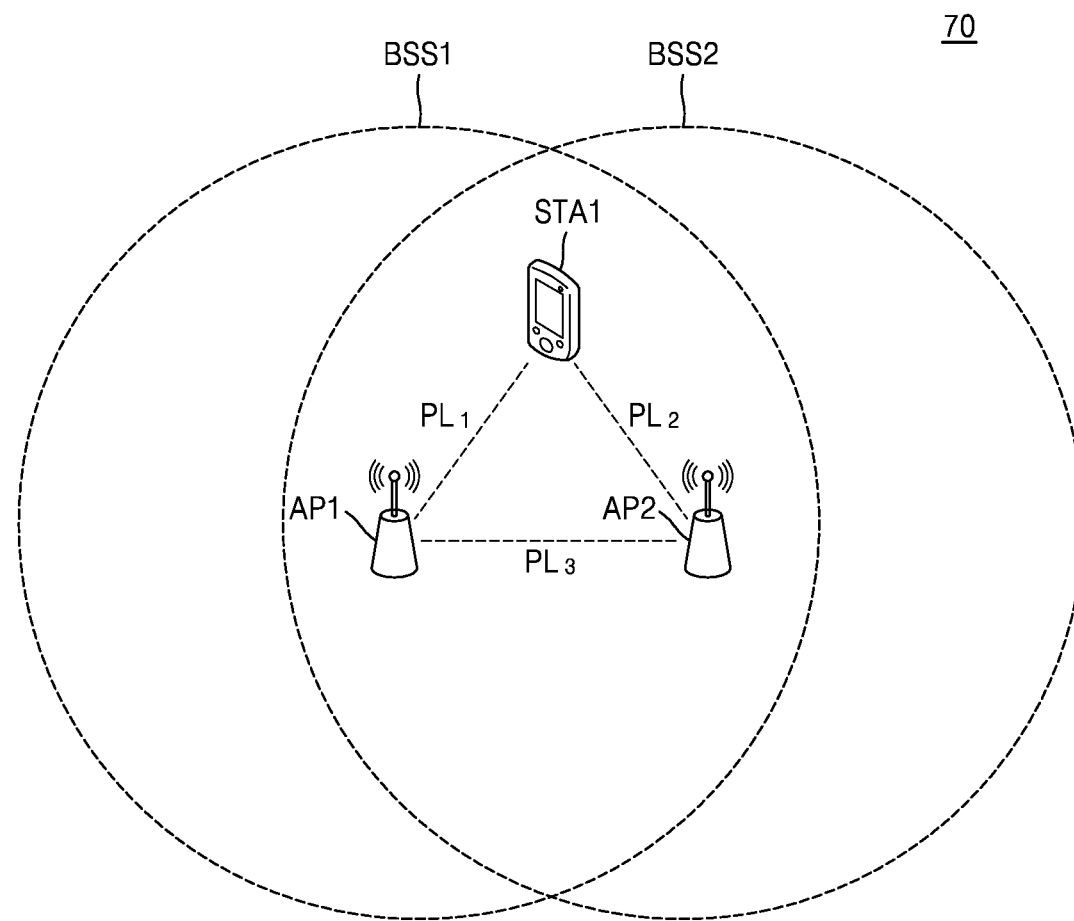
FIG. 7 is a diagram illustrating a wireless communication system according to an example embodiment of the inventive concept.

FIG. 7 is a diagram illustrating a wireless communication system 70 according to an example embodiment of the inventive concept. For example, the diagram of FIG. 7 illustrates examples of the path loss considered in the coordinated spatial reuse in a case in which the downlink transmission occurs in the shared BSS. As illustrated in FIG. 7, a first path loss $PL_1$ between the first access point AP1 and the first station STA1, a second path loss $PL_2$ between the second access point AP2 and the second station STA2, and a third path loss $PL_3$ between the first access point AP1 and the second access point AP2 may be considered. In addition, the first access point AP1 may provide the first BSS BSS1, the second access point AP2 may provide the second BSS BSS2, and the first station STA1 may be included in the first BSS BSS1.

In the DL/DL scenario (for example, in operation S60 of FIG. 6), the transmit power limit may be determined based on the first path loss $PL_1$ and the second path loss $PL_2$. For example, the first path loss $PL_1$ may correspond to the loss of the signal transmitted by the first access point AP1, and the second path loss $PL_2$ may correspond to the loss of the signal transmitted by the second access point AP2. As the first path loss $PL_1$ is low and the second path loss $PL_2$ is high, it may be advantageous for the first station STA1 to successfully receive the first PPDU from the first access point AP1. Accordingly, the first access point AP1 may determine the transmit power limit based on the transmission power of the first access point AP1, the first path loss $PL_1$, and the second path loss $PL_2$. For example, the transmit power limit $TPL_{AP2}$ in the DL/DL scenario may satisfy the following Equation 1 when the transmission power of the first access point AP1 is $P_{AP1}$, and the minimum signal-to-interference ratio for the first station STA1 to successfully receive the first PPDU is $SIR_{STA1}$.

$$TPL_{AP2} \leq P_{AP1} - (PL_1 - PL_2) - SIR_{STA1} \qquad \text{[Equation 1]}$$

In the UL/DL scenario (for example, in operation S65 of FIG. 6), the transmit power limit may be determined based on the first path loss $PL_1$ and the third path loss $PL_3$. For example, the first path loss $PL_1$ may correspond to the loss of the signal transmitted by the first access point AP1, and the third path loss $PL_3$ may correspond to the loss of the signal transmitted by the second access point AP2. As the first path loss $PL_1$ is low and the third path loss $PL_3$ is high, it may be advantageous for the first access point AP1 to successfully receive the first PPDU from the first station STA1. Accordingly, the first access point AP1 may determine the transmit power limit based on the transmission power of the first station STA1, the first path loss $PL_1$, and the third path loss $PL_3$. For example, in the UL/DL scenario, the transmit power limit $TPL_{AP2}$ may satisfy the following Equation 2 when the transmission power of the first station STA1 is $P_{AP1}$ and the minimum signal-to-interference ratio for the first access point AP1 to successfully receive the first PPDU is $SIR_{AP1}$.

$$TPL_{AP2} \leq P_{STA1} - (PL_1 - PL_3) - SIR_{AP1} \qquad \text{[Equation 2]}$$

In some embodiments, the first station STA1 may calculate the first path loss $PL_1$ based on the frame output from the first access point AP1, and calculate the second path loss $PL_2$ based on the frame output from the second access point AP2.

The first station STA1 may report the first path loss $PL_1$ and the second path loss $PL_2$ to the first access point AP1. In addition, the first access point AP1 (or the second access point AP2) may calculate the third path loss $PL_3$ based on the frame output from the second access point AP2 (or the first access point AP1). Accordingly, the shared access point, that is, the first access point AP1, may obtain information on the first path loss $PL_1$, the second path loss $PL_2$, and the third path loss $PL_3$. An example of an operation of calculating the path loss based on the received frame will be described later with reference to FIG. 12.

Figure 8A:
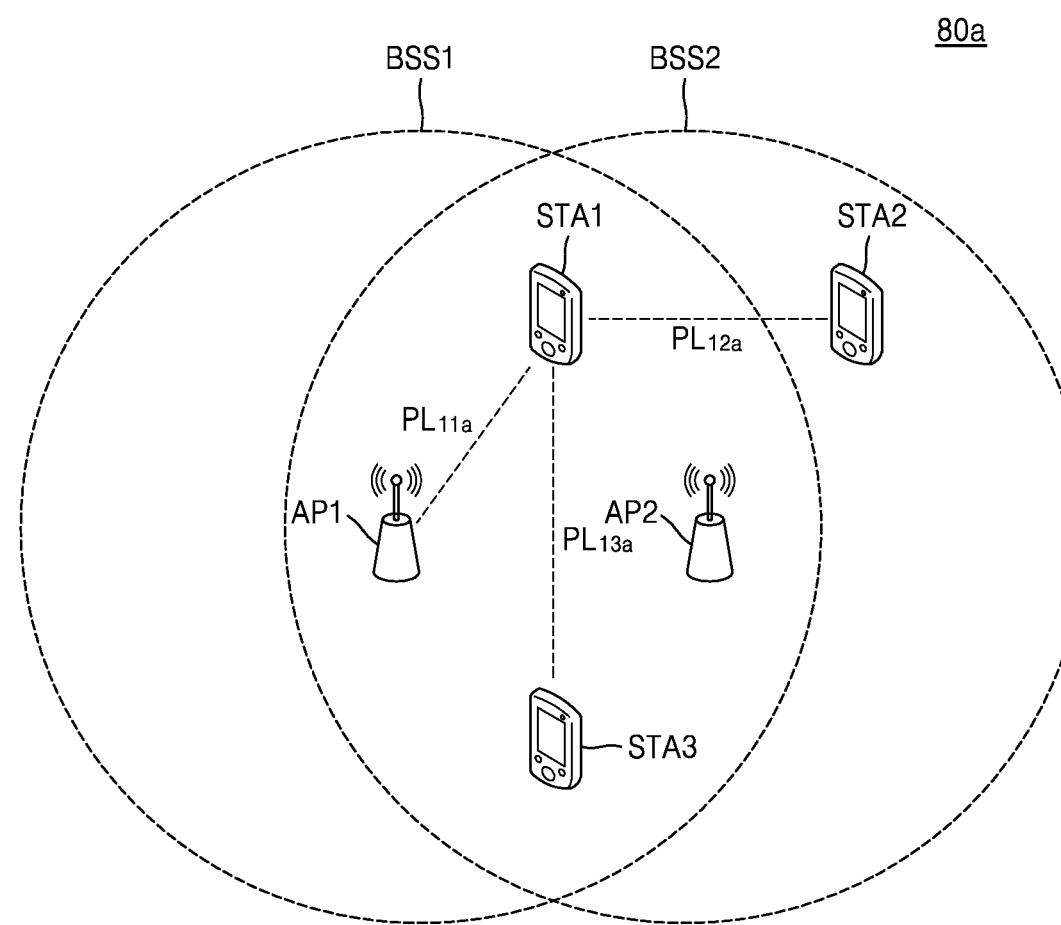
FIGS. 8A and 8B are diagrams illustrating examples of a wireless communication system according to example embodiments of the inventive concept.
Figure 8B:
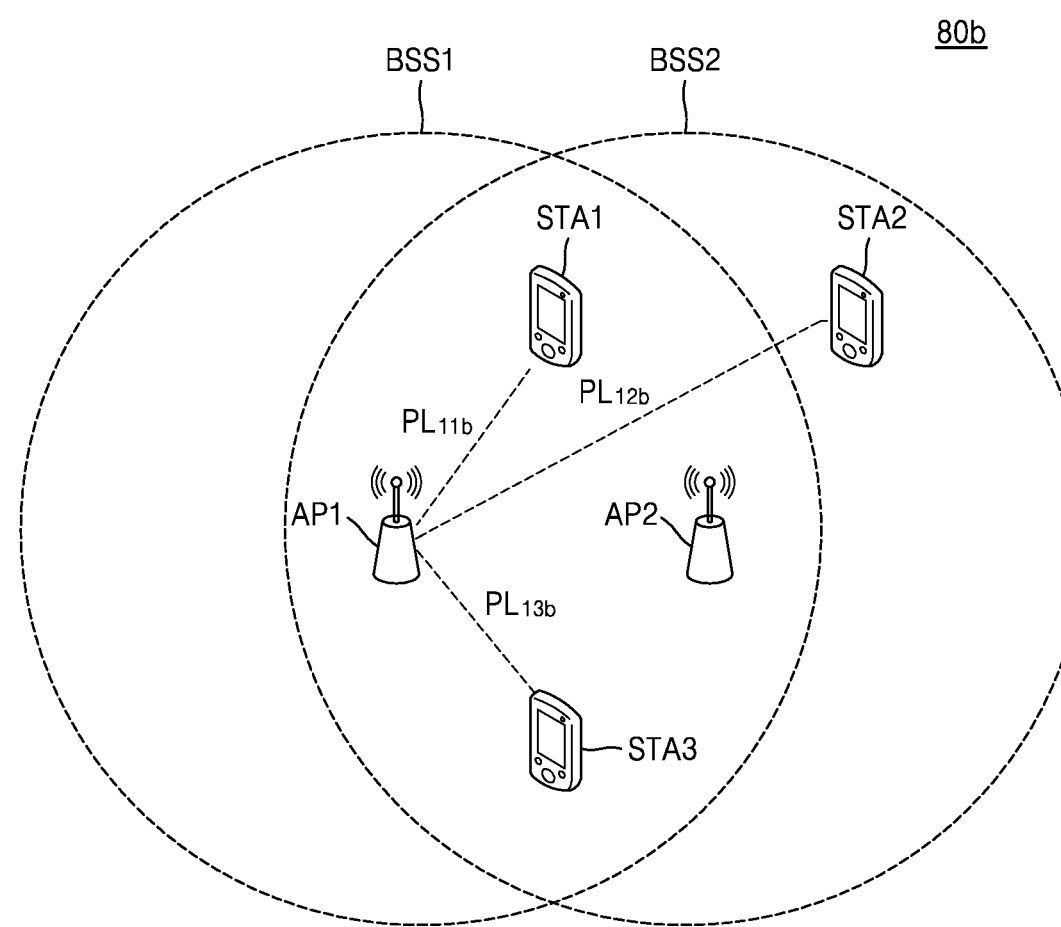

FIGS. 8A and 8B are diagrams illustrating examples of a wireless communication system according to example embodiments of the inventive concept. For example, the diagram of FIG. 8A illustrates examples of the path loss considered in the DL/UL scenario of the coordinated spatial reuse in the wireless communication system 80a, and the diagram of FIG. 8B illustrates examples of the path loss considered in the UL/UL scenario of the coordinated spatial reuse in the wireless communication system 80b. As illustrated in FIGS. 8A and 8B, the first station STA1 may be included in the first BSS BSS1 provided by the first access point AP1, and the second station STA2 and the third station STA3 may be included in the second BSS BSS2 provided by the second access point AP2.

Referring to FIG. 8A, in the DL/UL scenario, a first path loss $PL_{11a}$ between the first access point AP1 and the first station STA1, a second path loss $PL_{12a}$ between the second station STA2 and the first station STA1, and a third path loss $PL_{13a}$ between the third station STA3 and the first station STA1 may be considered. As the first path loss $PL_{11a}$ is low and the second path loss $PL_{12a}$ and the third path loss $PL_{13a}$ are high, it may be advantageous for the first access point AP1 to successfully receive the first PPDU from the first station STA1. The first station STA1 may calculate the first path loss $PL_{11a}$ based on the frame received from the first access point AP1, while obtaining of information on the second path loss $PL_{12a}$ and the third path loss $PL_{13a}$ may not be easy due to the second station STA2 and the third station STA3 that do not output frames.

Referring to FIG. 8B, in the UL/UL scenario, a first path loss $PL_{11b}$ between the first access point AP1 and the first station STA1, a second path loss $PL_{12b}$ between the first access point AP1 and the second station STA2, and a third path loss $PL_{13b}$ between the first access point AP1 and the third station STA3 may be considered. As the first path loss $PL_{11b}$ is low and the second path loss $PL_{12b}$ and the third path loss $PL_{13b}$ are high, it may be advantageous for the first access point AP1 to successfully receive the first PPDU from the first station STA1. The first access point AP1 may receive information on the first path loss $PL_{11b}$ from the first station STA1. In addition, as will be described later with reference to FIG. 11, the second access point AP2 may receive information on the second path loss $PL_{12b}$ and the third path loss $PL_{13b}$ from the second station STA2 and the third station STA3.

Figure 9:
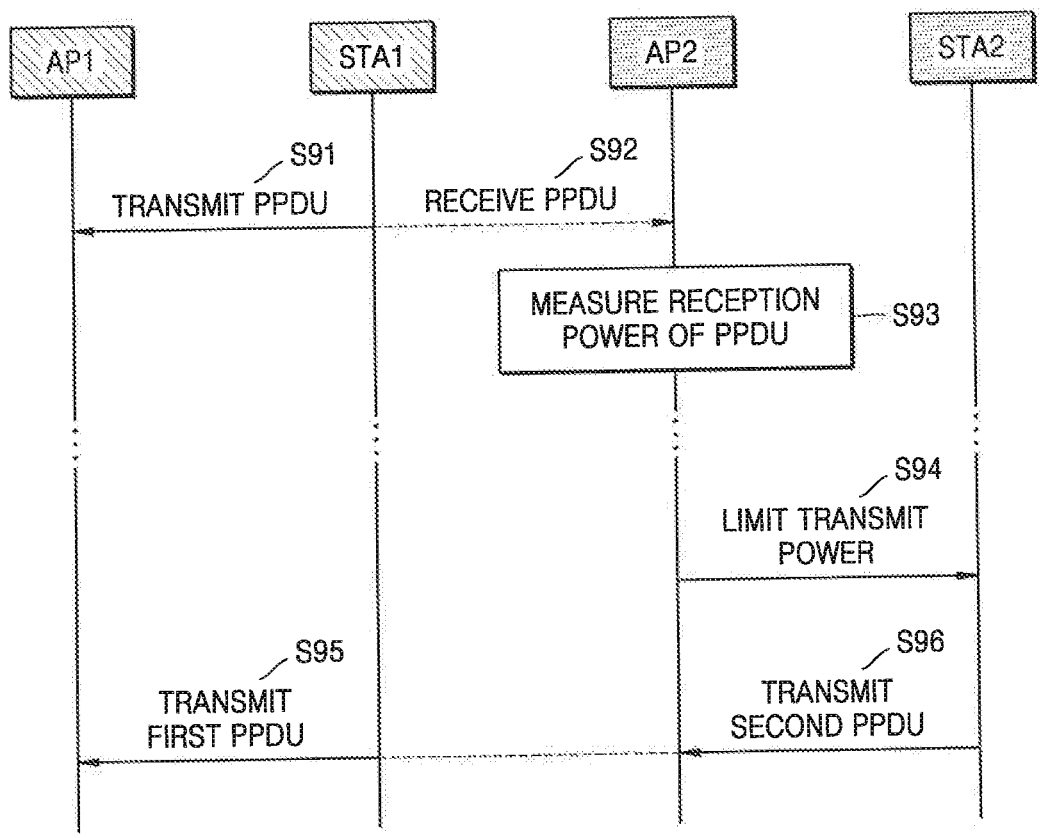
FIG. 9 is a message diagram illustrating a method for coordinated spatial reuse according to an example embodiment of the inventive concept.

FIG. 9 is a message diagram showing a method for the coordinated spatial reuse according to an example embodiment of the inventive concept. For example, the message diagram of FIG. 9 illustrates an operation performed in the DL/UL scenario of the coordinated spatial reuse described above with reference to FIGS. 3C and 8A. As illustrated in FIG. 9, the method for the coordinated spatial reuse may include a plurality of operations (S91 to S96). In FIG. 9, the first station STA1 may be included in the first BSS BSS1 provided by the first access point AP1, and the second station STA2 may be included in the second BSS BSS2 provided by the second access point AP2.

As described above with reference to FIG. 8A, it may not be easy to obtain some of the path losses in the DL/UL scenario of the coordinated spatial reuse. Accordingly, in order to reduce or minimize interference with the transmission of the sharing BSS (that is, the first BSS BSS1), the shared access point (that is, the second access point AP2) may conservatively determine the transmit power limit by itself and limit the transmission power of the uplink transmission based on the determined transmit power limit. As described below, in some embodiments, the shared access point may determine the transmit power limit based on the reception power measured from the transmission occurring in the sharing BSS.

Referring to FIG. 9, in operation S91, the first station STA1 may transmit the PPDU to the first access point AP1, and in operation S92, the second access point AP2 may receive the PPDU from the first station STA1. That is, the signal output by the first station STA1 to transmit the PPDU may reach the first access point AP1 as well as the second access point AP2, and accordingly, the second access point AP2 may receive the PPDU from the first station STA1.

In operation S93, the second access point AP2 may measure the reception power of the PPDU. For example, the second access point AP2 may measure the reception power based on a preamble of the PPDU received in operation S92. The second access point AP2 may estimate a low path loss between the second access point AP2 and the first station STA1 when the measured reception power is high, while the second access point AP2 may estimate a high path loss between the second access point AP2 and the first station STA1 when the measured reception power is low. Accordingly, in some embodiments, when the measured reception power exceeds the threshold value, the second access point AP2 may give up the uplink transmission in the shared TXOP.

In operation S94, the second access point AP2 may limit the transmission power to the second station STA2. For example, before operation S94 is performed, TXOP may be shared by the first access point AP1, and if the reception power measured in operation S93 is less than the threshold value, the second access point AP2 may determine the transmit power limit based on the measured reception power, the minimum signal-to-interference ratio to successfully receive the second PPDU, and the path loss between the second access point AP2 and the second station STA2. The second access point AP2 may limit the transmission power of the second station STA2 by transmitting a signal including the determined transmit power limit to the second station STA2.

In operation S95, the first station STA1 may transmit the first PPDU to the first access point AP1 in the shared TXOP, and in operation S96, the second station STA2 may transmit the second PPDU to the second access point AP2 in the shared TXOP. The second station STA2 may transmit the second PPDU with a transmission power about equal to or less than the transmit power limit provided from the second access point AP2 in operation S94, and the first access point AP1 may successfully receive the first PPDU.

Figure 10:
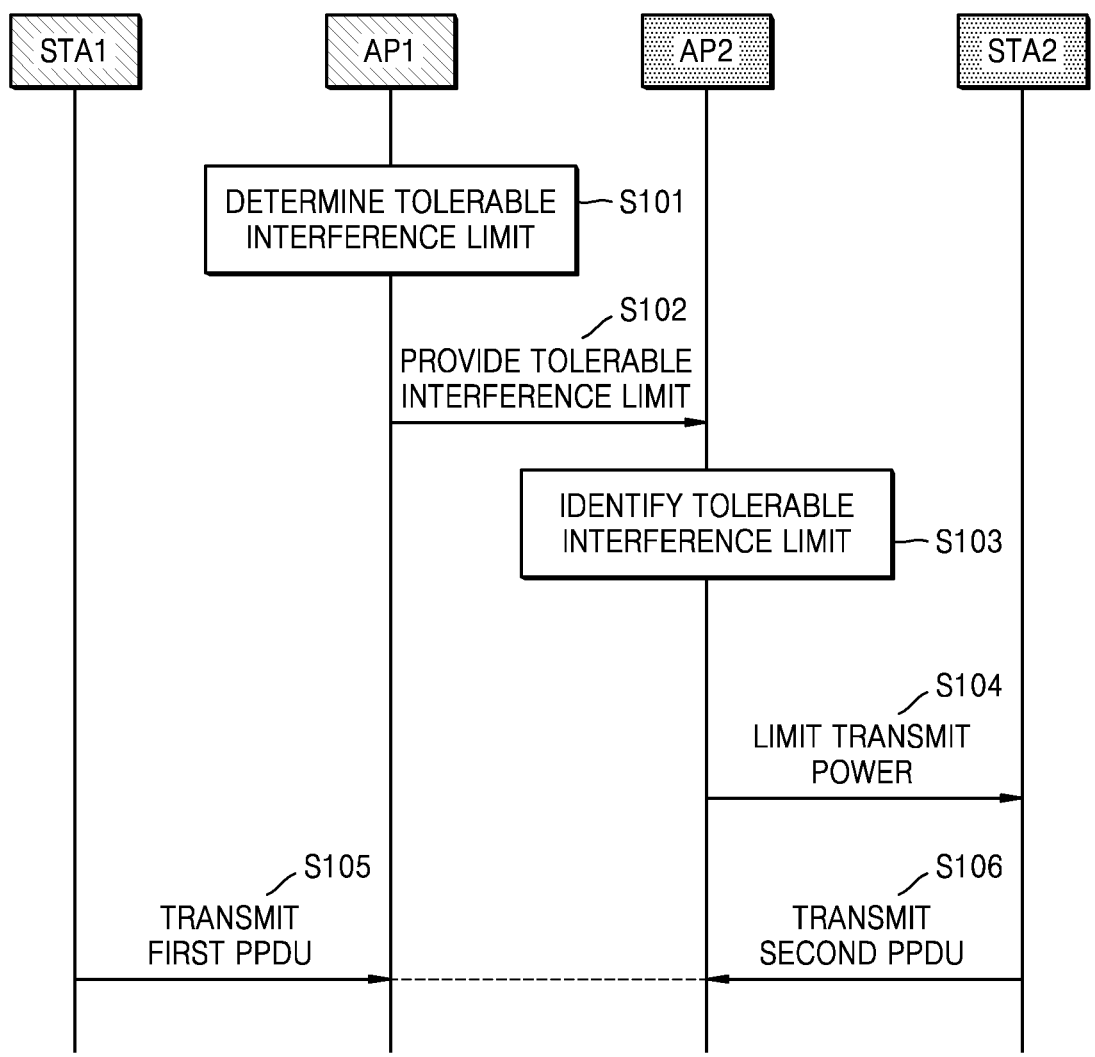
FIG. 10 is a message diagram illustrating a method for coordinated spatial reuse according to an example embodiment of the inventive concept.

FIG. 10 is a message diagram showing a method for the coordinated spatial reuse according to an example embodiment of the inventive concept. For example, the message diagram of FIG. 10 illustrates an operation performed in the UL/UL scenario of the coordinated spatial reuse described above with reference to FIGS. 3D and 8B. As illustrated in FIG. 10, the method for the coordinated spatial reuse may include a plurality of operations (S101 to S106). In FIG. 10, the first station STA1 may be included in the first BSS BSS1 provided by the first access point AP1, and the second station STA2 may be included in the second BSS BSS2 provided by the second access point AP2. In the following description, FIG. 10 will be described with reference to FIG. 8B.

In operation S101, the first access point AP1 may determine a tolerable interference limit (TIL). The tolerable interference limit may correspond to the maximum interference allowed for the first access point AP1 to successfully receive the first PPDU. For example, the first access point AP1 may obtain the TXOP to receive the first PPDU from the first station STA1, and determine the tolerable interference limit based on at least one path loss associated with the first access point AP1. In some embodiments, the first access point AP1 may determine the tolerable interference limit based on the transmission power of the first station STA1, the first path loss $PL_{11b}$ of FIG. 8B, and the minimum signal-to-interference ratio to successfully receive the first PPDU. For example, the signal-to-interference ratio $SIR_{UL/UL}$ of the first access point AP1 of FIG. 8B may be calculated as illustrated in Equation 3 below.

$$SIR_{UL/UL} = (P_{STA1} - PL_{11b})(P_{STA2} - PL_{12b})(P_{STA3} - PL_{13b}) \quad \text{[Equation 3]}$$

In Equation 3, $P_{STA1}$, $P_{STA2}$, and $P_{STA3}$ represent transmission powers of the first station STA1, the second station STA2, and the third station STA3, respectively. On the right side of Equation 3, the first term may correspond to the reception power of the signal received by the first access point AP1 from the first station STA1, the second term may correspond to the reception power of the signal received by the first access point AP1 from the second station STA2, and the third term may correspond to the reception power of the signal received by the first access point AP1 from the third station STA3. Accordingly, the second term and the third term from the right side of Equation 3 may correspond to interference acting on the reception of the first PPDU. When the minimum signal-to-interference ratio for the first access point AP1 to successfully receive the first PPDU is $SIR_{AP1}$, $SIR_{UL/UL}$ in Equation 3 may be greater than or about equal to $SIR_{AP1}$, and accordingly, a tolerable interference limit $I_{AP1}^{max}$ that satisfies $SIR_{AP1}$ may satisfy the following Equation 4 ($SIR_{UL/UL} = SIR_{AP1}$).

$$I_{AP1}^{max} \leq (P_{STA2} - PL_{12b}) + (P_{STA3} - PL_{13b}) = (P_{STA1} - PL_{11b}) - SIR_{AP1} \quad \text{[Equation 4]}$$

In operation S102, the first access point AP1 may provide the tolerable interference limit to the second access point AP2. For example, the first access point AP1 may transmit a signal including the tolerable interference limit determined in operation S101 to the second access point AP2. In some embodiments, as described below with reference to FIG. 13, a tolerable interference limit may be included in the announcement frame.

In operation S103, the second access point AP2 may identify the tolerable interference limit. For example, the second access point AP2 may extract the tolerable interference limit from a signal received from the first access point AP1 in operation S102.

In operation S104, the second access point AP2 may limit the transmission power of the second station STA2. In some embodiments, the second access point AP2 may determine the transmit power of the second station STA2 based on the tolerable interference limit identified in operation S103 and at least one path loss associated with the first access point AP1. For example, the transmit power limit $P_{UL}^{max}$ of the uplink transmission may satisfy Equation 5 below based on the tolerable interference limit $I_{AP1}^{max}$ of Equation 4.

$$P_{UL}^{max} \leq PL_{12b} + PL_{13b} + I_{AP1}^{max}$$

The second access point AP2 may distribute transmission powers to stations (for example, STA2 and STA3 of FIG. 8B) in the multi-user (MU) environment based on Equation 5, and as illustrated in FIG. 10, in the single user environment, the transmit power limit $P_{UL}^{max}$ of Equation 5 may be provided to the second station STA2.

In operation S105, the first station STA1 may transmit the first PPDU to the first access point AP1 in the shared TXOP, and in operation S106, the second station STA2 may transmit the second PPDU to the second access point AP2 in the shared TXOP. The second station STA2 may transmit the second PPDU with a transmit power about equal to or less than the transmit power limit provided from the second access point AP2 in operation S104, and the first access point AP1 may successfully receive the first PPDU.

Figure 11:
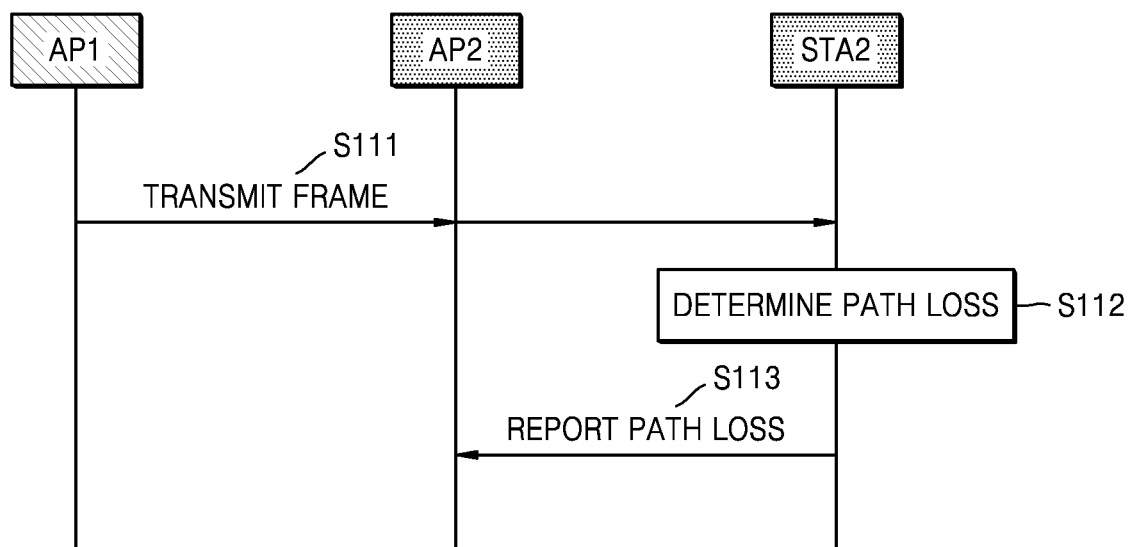
FIG. 11 is a message diagram illustrating a method for coordinated spatial reuse according to an example embodiment of the inventive concept.
Figure 12:
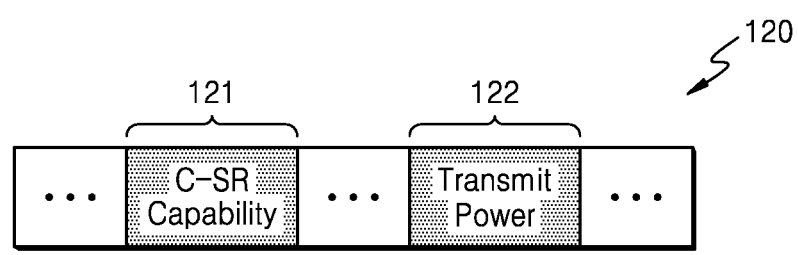
FIG. 12 is a diagram illustrating a frame according to an example embodiment of the inventive concept.

FIG. 11 is a message diagram showing a method for the coordinated spatial reuse according to an example embodiment of the inventive concept. FIG. 12 is a diagram illustrating a frame according to an example embodiment of the inventive concept. For example, the message diagram of FIG. 11 illustrates a method of acquiring path losses used in the UL/UL scenario of the coordinated spatial reuse, and the frame 120 of FIG. 12 may be used in the method of FIG. 11. In FIG. 11, the second station STA2 may be included in the second BSS BSS2 provided by the second access point AP2. In the following description, FIGS. 11 and 12 will be described with reference to FIG. 8B.

Referring to FIG. 11, the method for the coordinated spatial reuse may include a plurality of operations S111 to S113. In operation S111, the first access point AP1 may transmit the frame 120, and the second access point AP2 and the second station STA2 may respectively receive the frame 120. For example, each of the access points including the first access point AP1 and the second access point AP2 may periodically or aperiodically output the frame 120, and other access points or stations may receive the frame 120.

Referring to FIG. 12, the frame 120 may include a plurality of fields, and each of the plurality of fields may include information. For example, as illustrated in FIG. 12, the frame 120 may include a first field 121 including information on coordinated spatial reuse capability and a second field 122 including information on the transmission power of the frame 120. For example, the second access point AP2 and the second station STA2 may extract the first field 121 from the frame 120 received from the first access point AP1, and identify whether the first access point AP1 supports the coordinated spatial reuse based on the value of the first field 121. In addition, the second access point AP2 and the second station STA2 may extract the second field 122 from the frame 120, and identify the transmission power used by the first access point AP1 for the transmission power including the frame 120 based on the value of the second field 122. In some embodiments, the second field 122 may have the same format as that of the transmit power field included in the TPC report. The frame 120 of FIG. 12 may be an arbitrary frame including the first field 121 and the second field 122, for example, a beacon frame or a trigger frame.

Referring back to FIG. 11, in operation S112, the second station STA2 may determine a path loss (that is, $PL_1n$ of FIG. 8B) between the first access point AP1 and the second station STA2. For example, the second station STA2 may measure the reception power of the frame S111 and calculate the path loss as a difference between the measured reception power and the transmit power information included in the frame 120. In a similar manner, the path losses described above with reference to the drawings may be calculated at the access point and/or station based on the frame.

In operation S113, the second station STA2 may report the path loss. For example, the second station STA2 may transmit a signal including information on the path loss determined in operation S112 to the second access point AP2. The second station STA2 may report the path loss with the first access point AP1 providing the first BSS BSS1 and the second access point AP2 providing the second BSS BSS2 included therein. Accordingly, as described above with reference to FIG. 10, the second access point AP2 may determine the transmit power limit of the second station STA2 in the UL/UL scenario of the coordinated spatial reuse.

Figure 13:
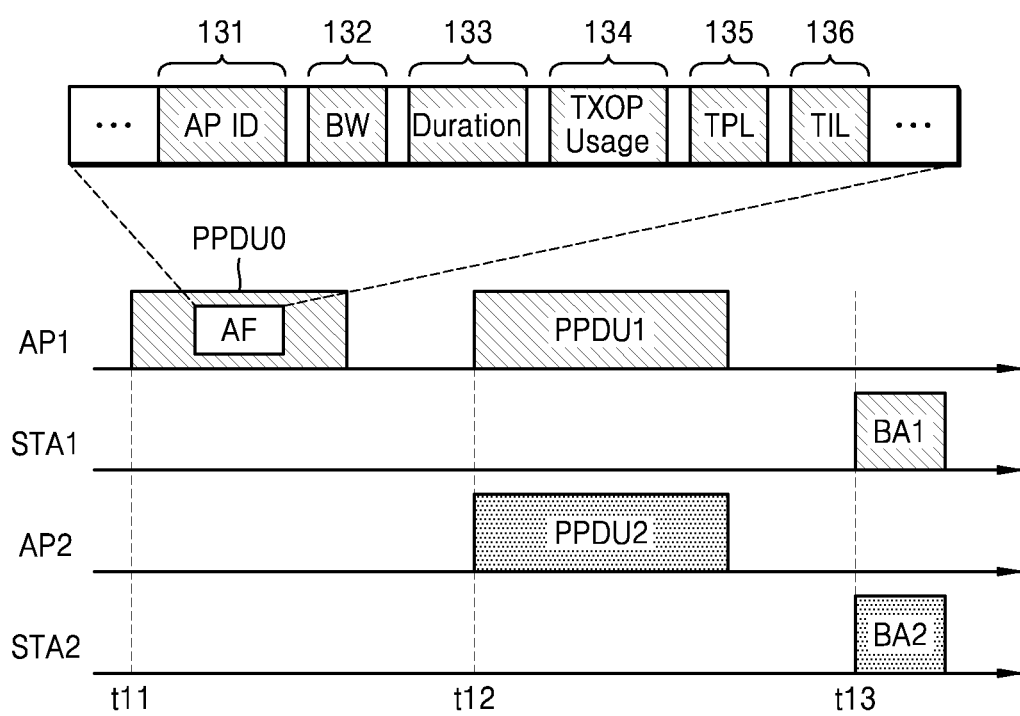
FIG. 13 is a timing diagram illustrating transmission based on coordinated spatial reuse according to an example embodiment of the inventive concept.

FIG. 13 is a timing diagram illustrating transmission based on the coordinated spatial reuse according to an example embodiment of the inventive concept. For example, the timing diagram of FIG. 13 illustrates an example of transmissions and announcement frames (AF) occurring in the DL/DL scenario of the coordinated spatial reuse. In FIG. 13, the first station STA1 may be included in the first BSS BSS1 provided by the first access point AP1, and the second station STA2 may be included in the second BSS BSS2 provided by the second access point AP2.

Referring to FIG. 13, at time t11, the first access point AP1 may transmit a PPDU (PPDU0) including an announcement frame AF to the second access point AP2 to share the TXOP. The announcement frame AF may include information necessary to share the TXOP. As illustrated in the upper part of FIG. 13, the announcement frame AF may include a plurality of fields, and each of the plurality of fields may include information. For example, as illustrated in FIG. 13, the announcement frame AF may include first to sixth fields 131 to 136.

The first field 131 may include identification information of the shared access point (that is, the second access point AP2). The second field 132 may include information on a bandwidth of the shared TXOP. The third field 133 may include information on a period in which the PPDU transmission is performed in the shared TXOP. As described above with reference to FIG. 4, the fourth field 134 may include information (for example, MSB and LSB of FIG. 5) indicating the type of transmission permitted to the shared access point. The fifth field 135 may include the transmit power limit (TPL) as described above with reference to FIG. 6. The sixth field 136 may include the tolerable interference limit (TIL) as described above with reference to FIG. 10. In some embodiments, at least one of the first to sixth fields 131 to 136 illustrated in FIG. 13 may be omitted in the announcement frame AF. The shared access point may control or perform the transmission of the shared BSS based on information included in the announcement frame AF.

In some embodiments, the announcement frame AF may include a plurality of fields for a plurality of shared access points. For example, as will be described later with reference to FIG. 16, the first access point AP1 may share the TXOP with the plurality of shared access points including the second access point AP2, and transmit the announcement frame AF including information to be provided to the plurality of shared access points. Accordingly, the announcement frame AF may include a plurality of fields respectively corresponding to a plurality of shared access points. For example, the announcement frame AF may include a plurality of first fields, a plurality of second fields, a plurality of third fields, a plurality of fourth fields, a plurality of fifth fields, and a plurality of sixth fields respectively corresponding to the plurality of shared access points. In addition, in some embodiments, the announcement frame AF may include a field indicating information common to the plurality of shared access points. For example, the announcement frame AF may include the second field 132 and the third field 133 common to the plurality of shared access points. Fields included in the announcement frame AF may be variously combined for the plurality of shared access points, and the configuration of the announcement frame AF is not limited to the foregoing.

At time t12, the first access point AP1 may transmit the first PPDU PPDU1 to the first station STA1 in the shared TXOP, and the second access point AP2 may transmit the second PPDU PPDU2 to the second station STA2 in the shared TXOP. As described above with reference to FIG. 6, the second access point AP2 may transmit the second PPDU PPDU2 with limited transmission power. Accordingly, the first station STA1 and the second station STA2 may successfully receive the first PPDU PPDU1 and the second PPDU PPDU2 in the shared TXOP, respectively, and at time t13, a first acknowledgment response BA1 and a second acknowledgment response BA2 may be transmitted to the first access point AP1 and the second access point AP2, respectively.

Figure 14:
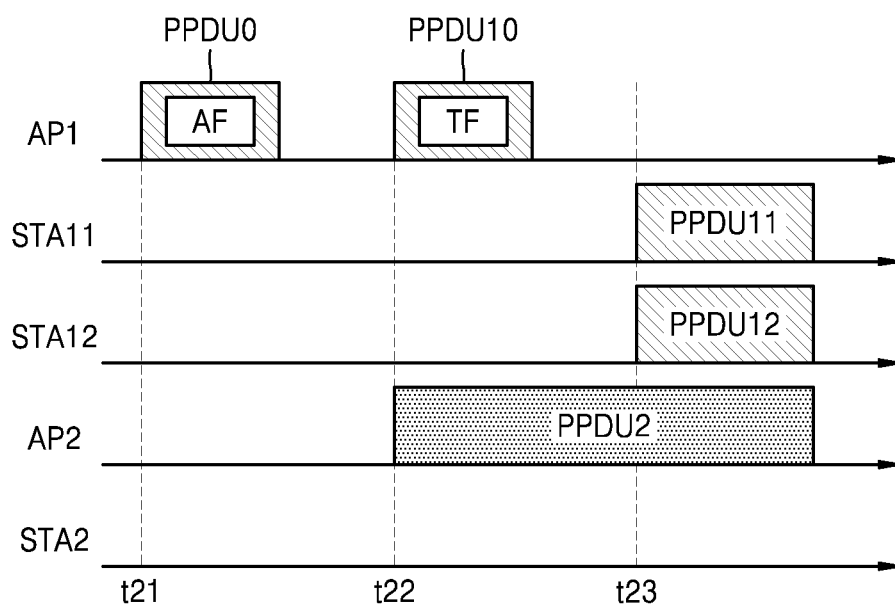
FIG. 14 is a timing diagram illustrating transmission based on coordinated spatial reuse according to an example embodiment of the inventive concept.

FIG. 14 is a timing diagram illustrating transmission based on the coordinated spatial reuse according to an example embodiment of the inventive concept. For example, the timing diagram of FIG. 14 illustrates the transmission occurring in the UL/DL scenario of the coordinated spatial reuse. In FIG. 14, first stations STA11 and STA12 may be included in the first BSS BSS1 provided by the first access point AP1, and the second station STA2 may be included in the second BSS BSS2 provided by the second access point AP2.

Referring to FIG. 14, at time t21, the first access point AP1 may transmit the PPDU PPDU0 including the announcement frame AF to the second access point AP2. For example, the first access point AP1 may obtain the TXOP to receive the first PPDUs PPDU11 and PPDU12, and may transmit the announcement frame AF to the second access point AP2 to share the obtained TXOP.

At time t22, the first access point AP1 may transmit the PPDU PPDU10 including the trigger frame TF to the first stations STA11 and STA12, and the second access point AP2 may transmit the second PPDU PPDU2 to the second station STA2. At time t23, the first stations STA11 and STA12 may transmit the first PPDUs PPDU11 and PPDU12 to the first access point AP1 in response to the trigger frame TF.

Figure 15A:
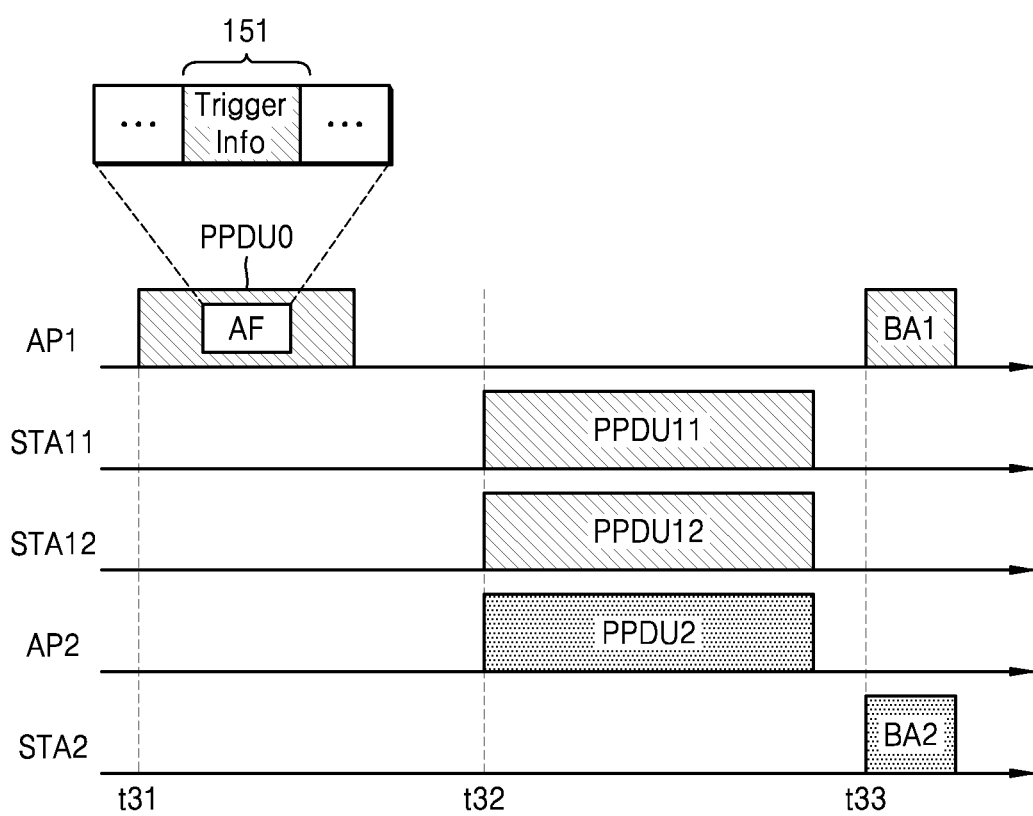
FIGS. 15A and 15B are timing diagrams illustrating transmission based on coordinated spatial reuse according to example embodiments of the inventive concept.
Figure 15B:
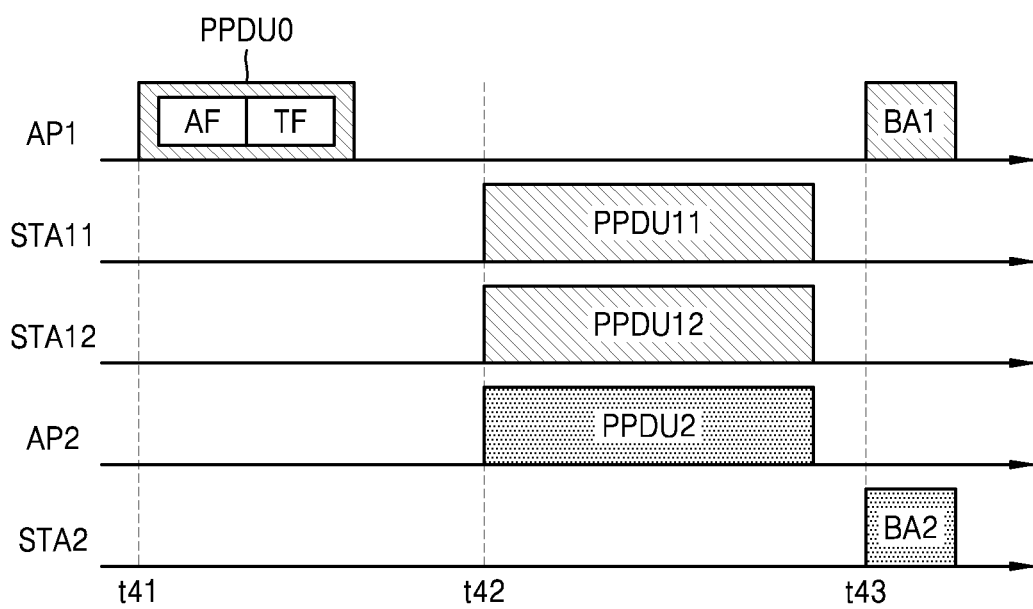

The first access point AP1 may generate the announcement frame AF based on the UL/DL scenario of the coordinated spatial reuse, but as illustrated in FIG. 14, transmission of the PPDU PPDU10 including the trigger frame TF in the shared TXOP and transmission of the second PPDU PPDU2 may overlap. To eliminate the overlap, in a case in which the second access point AP2 delays the transmission of the second PPDU PPDU2 to time t23, the transmissions of the first PPDUs PPDU11 and PPDU12 and the second PPDU PPDU2 are successful, but the completion of the transmissions in the shared TXOP may be delayed. Referring to FIGS. 15A and 15B, a method for successfully performing the transmissions without delaying the completion of the transmissions in the UL/DL scenario of the coordinated spatial reuse will be described later.

FIGS. 15A and 15B are timing diagrams illustrating transmission based on the coordinated spatial reuse according to example embodiments of the inventive concept. For example, each of the timing diagrams of FIGS. 15A and 15B represents the transmissions occurring in the UL/DL scenario of the coordinated spatial reuse. In FIGS. 15A and 15B, the first stations STA11 and STA12 may be included in the first BSS BSS1 provided by the first access point AP1, and the second station STA2 may be included in the second BSS BSS2 provided by the second access point AP2. In the description of FIGS. 15A and 15B, a further description of elements and technical aspects previously described may be omitted for convenience of explanation.

Referring to FIG. 15A, at time t31, the first access point AP1 may transmit the PPDU0 including the announcement frame AF to the second access point AP2 and the first stations STA11 and STA12. The announcement frame AF may include a trigger information field 151. For example, the announcement frame AF may include at least one subfield of at least a part of a common information field and a user information field included in the trigger frame TF of FIG. 14. Accordingly, transmission of a separate PPDU including the trigger frame may be omitted, and as a result, the transmissions may be successfully completed early in the UL/DL scenario of the coordinated spatial reuse.

At time t32, the first stations STA11 and STA12 may transmit the first PPDUs PPDU11 and PPDU12 to the first access point AP1 in the shared TXOP, and the second access point AP2 may transmit the second PPDU PPDU2 to the second station STA2 in the shared TXOP. For example, the first stations STA11 and STA12 may obtain information for the uplink transmission based on a value of the trigger information field 151 of the announcement frame AF, and may transmit the first PPDUs PPDU11 and PPDU12 to the first access point AP1 based on the obtained information. The transmissions of the first PPDUs PPDU11 and PPDU12, and the second PPDU2 may be successfully completed, and accordingly, at time t33, the first access point AP1 may transmit the first acknowledgment response BA1 to the first stations STA11 and STA12, and the second access point AP2 may transmit the second acknowledgment response BA2 to the second station STA2.

Referring to FIG. 15B, at time t41, the first access point AP1 may transmit the PPDU PPDU0 including the announcement frame AF and the trigger frame TF to first stations STA11 and STA12 and the second access point AP2. For example, the announcement frame AF and the trigger frame TF may be aggregated in the PPDU PPDU0. In some embodiments, the PPDU PPDU0 including the aggregated announcement frame AF and the trigger frame TF may have a format of an aggregated MAC protocol data unit (A-MPDU). Accordingly, transmission of a separate PPDU including the trigger frame may be omitted, and as a result, the transmissions may be successfully completed early in the UL/DL scenario of the coordinated spatial reuse.

At time t42, the first stations STA11 and STA12 may transmit the first PPDUs PPDU11 and PPDU12 to the first access point AP1 in the shared TXOP, and the second access point AP2 may transmit the second PPDU PPDU2 to the second station STA2 in the shared TXOP. Then, at time t43, the first access point AP1 may transmit the first acknowledgment response BA1 to the first stations STA11 and STA12, and the second access point AP2 may transmit the second acknowledgment response BA2 to the second station STA2.

Figure 16:
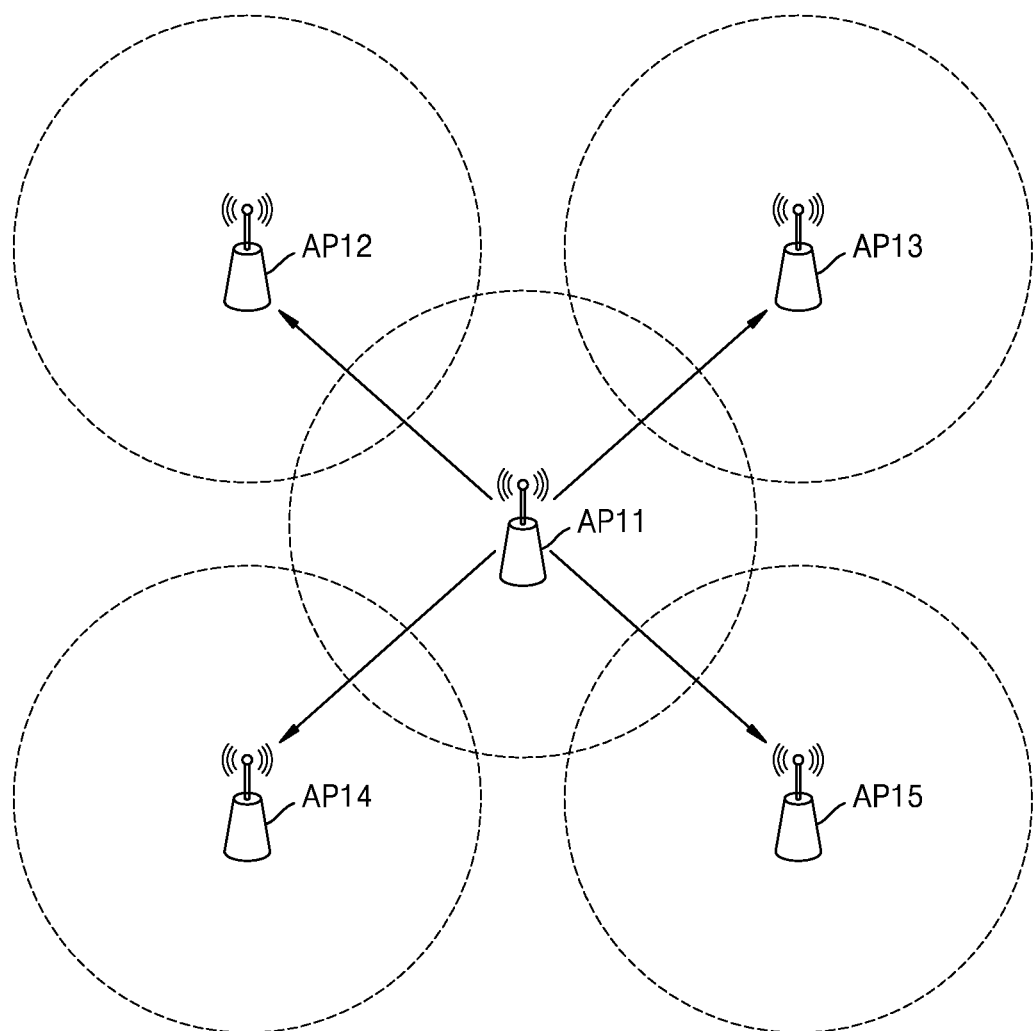
FIG. 16 is a diagram illustrating a wireless communication system according to an example embodiment of the inventive concept.

FIG. 16 is a diagram illustrating a wireless communication system 160 according to an example embodiment of the inventive concept. As illustrated in FIG. 16, the wireless communication system 160 may include first to fifth access points AP11 to AP15.

In some embodiments, the sharing access point may share the TXOP with a plurality of shared access points. For example, in a case in which the first access point AP11 obtains the TXOP to transmit the PPDU, the first access point AP11 transmits the announcement frame, thereby sharing the TXOP with the second to fifth access points AP12 to AP15 among neighboring access points. In some embodiments, the first access point AP11 may permit the uplink transmission and/or the downlink transmission to each of the second to fifth access points AP12 to AP15. In some embodiments, the first access point AP11 may provide the transmit power limit and/or the tolerable interference limit to each of the second to fifth access points AP12 to AP15. Accordingly, various scenarios of the coordinated spatial reuse may be implemented, and as a result, the efficiency of the wireless communication system 160 may be highly increased.

In some embodiments, the sharing access point may allocate radio resources used for the transmissions of the plurality of shared access points. For example, in a case in which the first access point AP11 obtains the TXOP to transmit the PPDU, the first access point AP11 may allocate an upper band of the bandwidth to the second access point AP12, and allocate a lower band of the bandwidth to the third access point AP13 and the fourth access point AP14. To this end, the first access point AP11 may transmit the announcement frame including resource allocation information, that is, band allocation information, and each of the second to fifth access points AP12 to AP15 may identify the band based on the band allocation information included in the band frame, and may transmit the PPDU to at least one station in the identified band.

Figure 17:
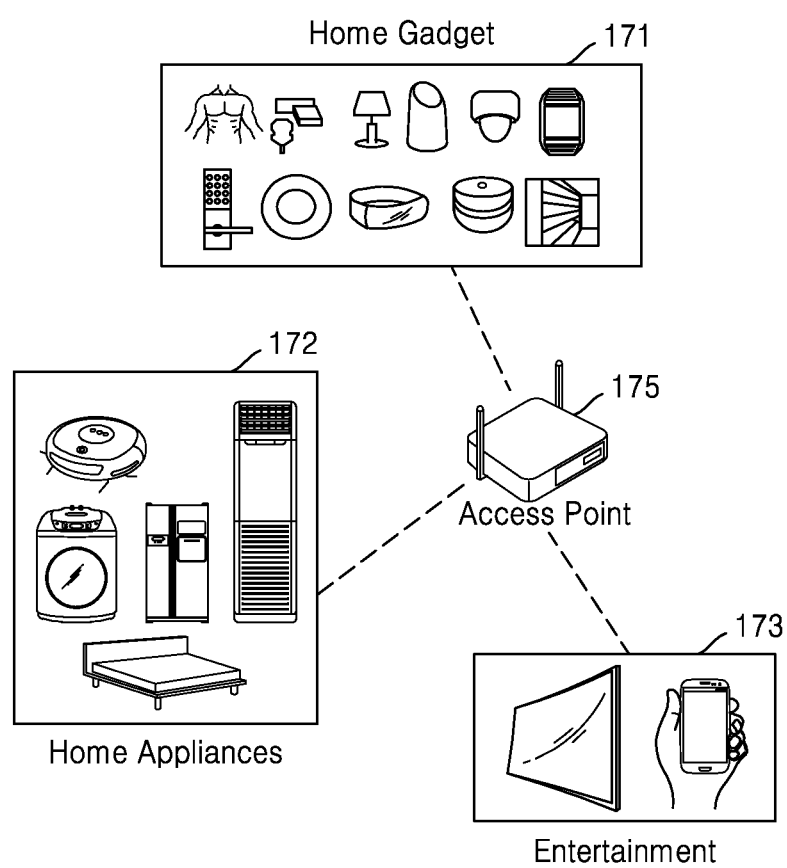
FIG. 17 is a diagram illustrating examples of an apparatus for wireless communication according to an example embodiment of the inventive concept.

FIG. 17 is a diagram showing examples of an apparatus for wireless communication according to an example embodiment of the inventive concept. For example, FIG. 17 illustrates an Internet of Things (IoT) network system including home gadgets 171, home appliances 172, entertainment apparatuses 173, and an access point 175.

In some embodiments, in the apparatus for wireless communication of FIG. 17, the method for the coordinated spatial reuse described above with reference to the drawings may be performed. For example, the access point 175 (that is, the sharing access point) that obtains the TXOP may share the TXOP with a neighboring access point (that is, a shared access point), transmit the PPDU to the home gadgets 171, the home appliances 172, and/or the entertainment apparatuses 173 in the shared TXOP, or may receive the PPDU from the home gadgets 171, the home appliances 172, and/or the entertainment apparatuses 173. In some embodiments, home gadgets 171, home appliances 172 and/or the entertainment apparatuses 173 may report at least one path loss to the access point 175. As described above with reference to the drawings, various scenarios of the coordinated spatial reuse may be supported, and accordingly, the home gadgets 171, the home appliances 172 and/or the entertainment apparatuses 173 may successfully transmit or receive the PPDU. At the same time, in embodiments, the peripheral access points and stations do not delay the transmission of the PPDU, and as a result, the efficiency of the IoT network system may be increased.

As is traditional in the field of the present inventive concept, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

As will be appreciated by one skilled in the art, aspects of the present inventive concept may be embodied as a system, method or computer program product. Accordingly, aspects of the present inventive concept may take the form of an entirely hardware embodiment, an entirely software embodiment (including firmware, resident software, micro-code, etc.) or an embodiment combining software and hardware aspects that may all generally be referred to herein as a "circuit," "module," "unit" or "system." Furthermore, aspects of the present inventive concept may take the form of a computer program product embodied in one or more computer readable medium(s) having computer readable program code embodied thereon. If implemented in software, the functions may be stored on or transmitted over as one or more instructions or code on a tangible, non-transitory computer-readable medium.

While the present inventive concept has been particularly shown and described with reference to the example thereof, it will be understood by those of ordinary skill in the art that various changes in form and detail may be made therein without departing from the spirit and scope of the present inventive concept as defined by the following claims.

What is claimed is:

1. A first apparatus for wireless communication, the first apparatus comprising:
   a transceiver; and
   a processing circuitry configured to:
   obtain a shared transmit opportunity (TXOP) to transmit or receive a first physical layer protocol data unit (PPDU) through the transceiver,
   permit at least one of transmission or reception of a second PPDU to a second apparatus through the transceiver in the shared TXOP, and
   transmit the first PPDU to at least one third apparatus through the transceiver in the shared TXOP or receive the first PPDU from the at least one third apparatus in the shared TXOP.

2. The first apparatus of claim 1, wherein the processing circuitry is further configured to provide information indicating permitted transmission and/or permitted reception of the second PPDU to the second apparatus through the transceiver.

3. The first apparatus of claim 1, wherein the processing circuitry is further configured to provide a transmit power limit of transmission of the second PPDU to the second apparatus through the transceiver when transmission of the second PPDU is permitted.

4. The first apparatus of claim 3, wherein the processing circuitry is further configured to:
   acquire information on at least one path loss, and
   determine the transmit power limit based on the at least one path loss.

5. The first apparatus of claim 4, wherein the processing circuitry is further configured to:
   receive information on a first path loss between the first apparatus and one of the at least one third apparatus from the one of the at least one third apparatus through the transceiver, and
   receive information on a second path loss between the second apparatus and the one of the at least one third apparatus through the transceiver.

6. The first apparatus of claim 4, wherein the processing circuitry is further configured to:
   receive information on a first path loss between the first apparatus and one of the at least one third apparatus from the one of the at least one third apparatus through the transceiver, and
   determine a third path loss between the first apparatus and the second apparatus, based on a frame received from the second apparatus.

7. The first apparatus of claim 1, wherein the processing circuitry is further configured to provide a tolerable interference limit of transmission or reception of the first PPDU to the second apparatus through the transceiver when reception of the second PPDU is permitted.

8. The first apparatus of claim 7, wherein the processing circuitry is further configured to:
   acquire information on at least one path loss, and
   determine the tolerable interference limit based on the at least one path loss.

9. The first apparatus of claim 1, wherein the processing circuitry is further configured to permit only transmission of the second PPDU when transmission of the second PPDU is permitted.

10. The first apparatus of claim 1, wherein the processing circuitry is further configured to transmit an announcement frame to the second apparatus through the transceiver when transmission of the second PPDU is permitted.

11. The first apparatus of claim 1, the processing circuitry is further configured to output a frame including transmission power information indicating transmission power of the frame through the transceiver.

12. A wireless communication method performed by a first apparatus, the method comprising:
   acquiring a shared transmit opportunity (TXOP) to transmit or receive a first physical layer protocol data unit (PPDU);
   providing a tolerable interference limit of transmission or reception of the first PPDU in the shared TXOP to a second apparatus; and
   transmitting the first PPDU to at least one third apparatus in the shared TXOP or receiving the first PPDU from the at least one third apparatus in the shared TXOP.

13. The method of claim 12, further comprising:
   acquiring information on at least one path loss; and
   determining the tolerable interference limit based on the at least one path loss.

14. The method of claim 13, wherein the acquiring of information on the at least one path loss includes receiving, from one of the at least one third apparatus, information on a first path loss between the first apparatus and the one of the at least one third apparatus, and
   the determining of the tolerable interference limit is based on transmission power of the first PPDU and the first path loss.

15. The method of claim 12, further comprising transmitting an announcement frame to the second apparatus.

16. The method of claim 15, wherein when the TXOP is obtained to receive the first PPDU, the announcement frame includes information included in a trigger frame for reception of the first PPDU, and transmission of the trigger frame to the at least one third apparatus is omitted.

17. The method of claim 15, further comprising:

transmitting a trigger frame to the at least one third apparatus when the TXOP is obtained to receive the first PPDU, wherein the announcement frame and the trigger frame are aggregated in one PPDU.

18. A third apparatus for wireless communication in a transmit opportunity (TXOP) shared by a first apparatus and a second apparatus, the apparatus comprising:

a transceiver; and a processing circuitry configured to:

receive a frame from the first apparatus through the transceiver, determine a path loss between the first apparatus and the third apparatus based on the frame, transmit information on the path loss to the second apparatus through the transceiver, and receive a physical layer protocol data unit (PPDU) in the shared TXOP from the second apparatus or transmit the PPDU to the second apparatus through the transceiver in the shared TXOP.

19. The third apparatus of claim 18, wherein the processing circuitry is further configured to:

receive information on maximum transmission power of transmission of the PPDU from the second apparatus through the transceiver, and transmit the PPDU to the second apparatus through the transceiver with a transmit power equal to or less the maximum transmit power.

20. The third apparatus of claim 18, wherein the processing circuitry is further configured to:

extract transmission power information from the frame, acquire measured reception power of the frame, and calculate the path loss based on the transmission power and the measured reception power.

* * * * *